United States Patent
MacNeil

(10) Patent No.: US 9,283,933 B2
(45) Date of Patent: Mar. 15, 2016

(54) CLEANING SYSTEM

(75) Inventor: Daniel J. MacNeil, Barrie (CA)

(73) Assignee: Ryko Canada, Inc., Grimes, IA (US)

( * ) Notice: Subject to any disclaimer, the term of this patent is extended or adjusted under 35 U.S.C. 154(b) by 1719 days.

(21) Appl. No.: 12/382,632

(22) Filed: Mar. 19, 2009

(65) Prior Publication Data

US 2009/0241989 A1    Oct. 1, 2009

Related U.S. Application Data

(60) Provisional application No. 61/064,689, filed on Mar. 20, 2008.

(51) Int. Cl.
| | |
|---|---|
| B60S 3/04 | (2006.01) |
| A46B 9/02 | (2006.01) |
| A46B 13/00 | (2006.01) |
| A46B 13/02 | (2006.01) |
| B08B 1/04 | (2006.01) |

(52) U.S. Cl.
CPC . B60S 3/042 (2013.01); A46B 9/02 (2013.01); A46B 9/028 (2013.01); A46B 13/008 (2013.01); A46B 13/02 (2013.01); B08B 1/04 (2013.01); A46B 2200/3046 (2013.01)

(58) Field of Classification Search
CPC ............ B60S 3/042; B60S 3/06; B60S 3/004; B60S 3/04; A61G 5/10; A46B 9/02; A46B 9/028; A46B 13/008; A46B 13/02; B08B 1/04
USPC ......... 15/53.4, 53.1, 97.3, 179, 230, 180, 181
See application file for complete search history.

(56) References Cited

U.S. PATENT DOCUMENTS

| | | | | |
|---|---|---|---|---|
| 1,123,516 | A | * | 1/1915 | Gaudron ......................... 15/181 |
| 2,754,531 | A | * | 7/1956 | Rowland ........................ 15/183 |
| 3,613,140 | A | | 10/1971 | Oas |
| 3,662,417 | A | * | 5/1972 | Fuhring et al. ................. 15/53.4 |
| 4,004,313 | A | | 1/1977 | Capra |
| 4,023,228 | A | | 5/1977 | Hanna |

(Continued)

FOREIGN PATENT DOCUMENTS

| | | |
|---|---|---|
| EP | 0 247 269 B1 | 5/1991 |
| EP | 0 407 695 B1 | 11/1993 |

(Continued)

OTHER PUBLICATIONS

Auto Laundry News Featured Article, "SONNY'S The CarWash Factory", http://www.carwashmag.com/pdf/aug_2006/TunnelWash.cfm, printed Sep. 25, 2006.

(Continued)

*Primary Examiner* — Robert Scruggs

(57) ABSTRACT

Methods, systems and apparatuses for are disclosed for cleaning a vehicle wheel surface on a vehicle wheel with a brush. A brush may comprise a plurality of resilient brush elements having varying lengths. The methods may provide for rotating the brush elements such that at any time during at least some of the plurality of brush elements are in engagement with the wheel surface. The wheel surface may be engaged by brush elements that have a length that changes cyclically and the brush elements may also cyclically vary the contact pressure between brush elements and the vehicle surface.

24 Claims, 16 Drawing Sheets

(56) References Cited

U.S. PATENT DOCUMENTS

| | | | |
|---|---|---|---|
| 4,192,036 A * | 3/1980 | Heymann | 15/53.3 |
| 4,192,037 A | 3/1980 | Capra | |
| 4,756,044 A | 7/1988 | Clark | |
| 4,878,262 A | 11/1989 | Stufflebeam et al. | |
| RE33,334 E | 9/1990 | Nelson | |
| 4,967,440 A | 11/1990 | Belanger | |
| 5,123,136 A | 6/1992 | Belanger et al. | |
| 5,127,123 A | 7/1992 | Belanger | |
| 6,260,225 B1 * | 7/2001 | Bowman | 15/53.4 |
| 6,461,429 B1 | 10/2002 | Gorra | |
| 2006/0207047 A1 | 9/2006 | Weyandt | |

FOREIGN PATENT DOCUMENTS

| | | |
|---|---|---|
| EP | 0 489 234 B1 | 12/1994 |
| EP | 0 647 416 A1 | 4/1995 |
| EP | 1 223 830 B1 | 9/2003 |

OTHER PUBLICATIONS

Sonny's The Car Wash Factory, "Tire Brush/Poodle Brush or Ninja Brush Manual" (last printed Mar. 17, 2007).

* cited by examiner

CLEANING SYSTEM

CROSS-REFERENCE TO RELATED APPLICATION

This application claims priority from U.S. provisional application No. 61/064,689, filed Mar. 20, 2008, the contents of which are hereby incorporated herein by reference.

FIELD OF THE INVENTION

The present invention relates generally to cleaning systems, including systems that clean the wheel rims and tires of a vehicle.

BACKGROUND OF THE INVENTION

Car wash systems employ several different types of devices or systems to clean the different parts of a vehicle. For example, different types of brushes are employed to deal with the different parts of a vehicle that require cleaning. For example, some types of brushes are suitable for cleaning the side panels of vehicles; other types of brushes are suitable for cleaning upward facing surfaces such as the roof and bonnet of a vehicle.

One particular area that has required specific attention is the cleaning of vehicle wheels including the tires and rims. Wheel cleaning devices of varying forms have been employed in the past in automated vehicle wash plants to clean vehicle wheels. For example, it is known to provide a tire cleaning system that includes a rotating brush mounted on a support frame that may be configured in a general parallelogram shape. The brush may be moved outwards against the tires on one side of a vehicle and pressure exerted by the brush against the wheels.

It is also known in cleaning vehicle wheels to mount a generally cylindrical shaped brush upon a shaft. The brush may be rotated along a rotational axis that is substantially parallel to the floor of the vehicle wash plant, and generally parallel to the side of the vehicle, or the direction of travel of the vehicle if employed in a conveyor type wash facility. Usually, the bristle length is constant progressively in a longitudinal direction along the brush axis of rotation.

Alternatively, the bristle length of the brush may progressively vary, longitudinally along the brush axis of rotation. For example, U.S. Pat. No. 3,613,140 discloses a brush having alternatively cylindrical bands comprised of longer and shorter bristles.

Other known wheel cleaning systems have been used with "rollover" (in bay) type vehicle wash systems where a vehicle is maintained in a stationary position during at least some cleaning operations. For example, U.S. Pat. No. 4,192,037 discloses a brush having bristles arranged parallel to the axis of rotation in a frusto conical configuration. The brush may be brought into contact with a vehicle wheel when a vehicle wheel is in a condition appropriate for cleaning.

Optimally cleaning a wide variety of vehicle wheels requires an aggressive approach that has proven challenging employing currently available wheel cleaning systems. One particular disadvantage that flows from the cylindrical envelope of the wheel cleaning brushes employed by current wheel cleaning systems, is that a relatively constant pressure is applied to a vehicle rim and tire as the brush is rotated. Applying a relatively constant pressure to a vehicle wheel does not provide optimum cleaning of the vehicle wheel, in part as a result of the small irregular surfaces and variable distance of these surfaces from the axis of rotation of the cylindrical brush. For example, a vehicle wheel having a rim comprised of spokes has many small irregular surfaces of varying distances from the axis of rotation. Additionally, rims used on some current vehicle wheels may have a concave shape, extending inwardly away from the tire sidewall. Thus, in cleaning even one type of wheel, there may be a great variety in the depth of penetration that is required for the brush to be able to adequately clean all surfaces. It may be difficult to clean both the sidewall and rim adequately with conventional wheel cleaning systems due to the variable distances of the surfaces from the axis of rotation.

Another shortcoming with current brush cleaning systems used to clean vehicle wheels is that the entire brush must be replaced, even if only a small segment becomes degraded or damaged, because such brushes are contiguous. Additionally, when conventional brushes made with bristles wear out in a particular area, the entire brush must be replaced. Therefore, an improved wheel cleaning system is desired that has a durable and effective brush assembly that may more effectively clean the rim and tire of a vehicle wheel.

SUMMARY OF THE INVENTION

In aspects of the present invention, the cleaning action effected by a brush may be enhanced to create a scrubbing action caused by multiple cleaning elements. The scrubbing action may be created by cyclically changing both (a) the effective cleaning element length that engages the wheel and (b) the contact pressure applied by each of the cleaning elements.

According to one aspect of the invention there is provided a system for cleaning a vehicle wheel on a vehicle, the system comprising a plurality of cleaning elements mounted for rotation about, and extending generally radially outward from, a longitudinally oriented rotational axis, the axis being positioned at a suitable height to clean the wheel, at least some of the plurality of cleaning elements having a radial envelope that has substantially continuous and gradually varying radial distances from the rotational axis.

According to another aspect of the invention there is provided a system for cleaning a vehicle wheel on a vehicle, the system comprising a brush mounted for rotation about a longitudinally oriented rotational axis positioned at a suitable height to clean the wheel, the brush having an envelope that has a varying radial distances from the rotational axis.

According to yet another aspect of the invention there is provided a vehicle wash system comprising: (a) a floor having a wheel washing section; (b) an apparatus for cleaning a tire located in the washing section, the apparatus comprising: (i) a shaft mounted for rotation about a rotational axis, and wherein the rotational axis is oriented generally parallel to the outward facing surface of the vehicle wheel and to the floor portion; (ii) at least one brush component mounted for rotation on the shaft, the brush component having an envelope located at varying radial distances from the rotational axis; and (iii) a motor for driving the shaft in rotation about the rotational axis.

According to a further aspect of the invention there is provided a brush assembly for mounting on a shaft defining a rotational axis in a system to clean a vehicle wheel comprising first and second brush components, each of the first and second brush components having an envelope located at varying radial distances from the shaft; the first brush component being mounted on the shaft at a first angular position, and the second brush component being mounted on the shaft at a second angular position, the first angular position being out of phase with the second angular position.

According to a still further aspect of the invention there is provided a system for cleaning a vehicle wheel that is generally oriented vertically and longitudinally, the system comprising: (a) a brush assembly mounted for rotation about a rotational axis that is generally oriented transversely, the brush assembly having a plurality of cleaning elements extending generally transversely, each of the plurality of cleaning elements having a length and the length of the cleaning elements being non-uniform; (b) an actuator coupled to the brush assembly to force the cleaning elements of the brush assembly against the vehicle wheel; and (c) a rotator coupled to the brush assembly to rotate the plurality of cleaning elements generally about the rotational axis against the outer surface of the vehicle wheel; wherein during operation, the plurality of cleaning elements having different lengths engage locations on the wheel and the cleaning elements impart varying contact pressure on each of the locations on the wheel.

According to another aspect of the invention there is provided a method of cleaning a vehicle wheel surface on a vehicle wheel with a brush, the brush comprising a plurality of resilient brush elements having varying lengths, the method comprising rotating the brush elements such that at any time during the rotating at least some of the plurality of brush elements are in engagement with the wheel surface, such that the wheel surface is engaged by brush elements that have a length that change cyclically and the brush elements cyclically vary the contact pressure between brush elements and the vehicle surface.

According to yet another aspect of the invention there is provided a system for cleaning a vehicle wheel surface on a vehicle wheel, the system comprising: (a) a brush comprising a plurality of resilient brush elements having varying lengths; (b) a rotator operable to rotate the brush elements about an axis of rotation such that at any time during rotation at least some of the plurality of brush elements are in engagement with the wheel surface, such that the wheel surface is engaged by brush elements that have a length that change cyclically and the brush elements cyclically vary the contact pressure between brush elements and the vehicle surface.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

A wheel cleaning system may be employed within and as part of a vehicle wash plant, for example a conveyor-type or tunnel-type vehicle wash plant. In a conveyor-type vehicle wash plant, a conveyor guides and moves a vehicle through a facility having a series of different stages. In a tunnel-type wash plant, the driver may personally drive the vehicle through a series of different stages. Similarly, wheel-cleaning systems may be employed in "rollover" type wash systems, where a number of operations are carried out upon a stationary vehicle, with suitable modification. Alternatively, wheel cleaning systems specifically designed for use in "rollover" type wash systems may be employed.

Figure 1:
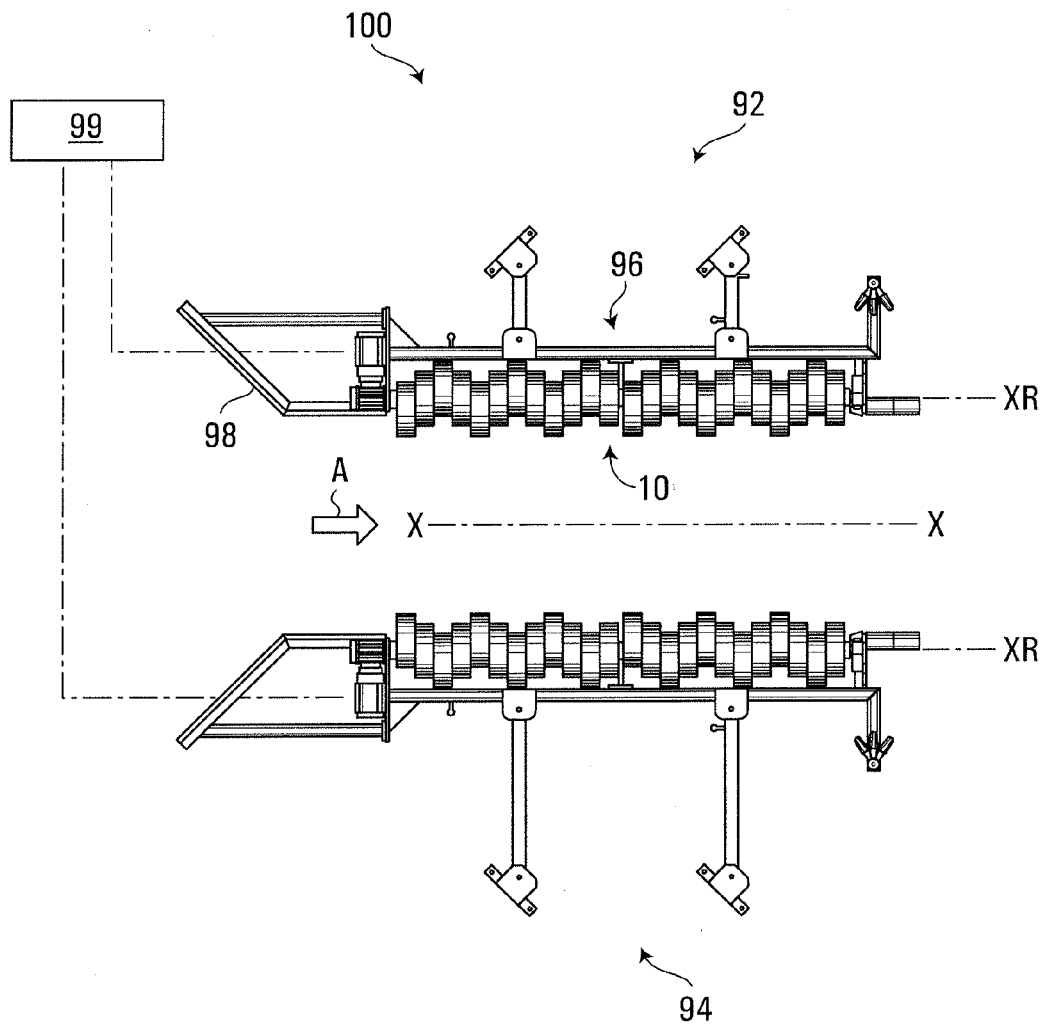
FIG. 1 is a plan view of a configuration of an embodiment of a tire cleaning system.

As shown in FIG. 1, a wheel cleaning system generally designated 100 may include two opposed wheel cleaning apparatuses 92 and 94. The operation of tire cleaning apparatuses 92, 94 may be controlled by a wash system controller 99, that may for example be a model MTC controller made by MacNeil Wash Systems.

Wheel cleaning apparatus 92 may clean the wheels of a vehicle on one side of a vehicle (not shown in FIG. 1), and wheel cleaning apparatus 94 may clean the vehicle wheels on the opposite side of the vehicle, as the vehicle proceeds through the wash plant in the direction of arrow A, parallel to a central axis X-X. For example, when a wheel cleaning apparatus 92 is employed in a conveyor-type wash plant, a conveyor (not shown) may move and guide a vehicle along axis X-X in direction A. As the vehicle moves past the wheel cleaning apparatus 92, the wheel cleaning apparatus 92 may engage at least one vehicle wheel (not shown in FIG. 1).

Each of wheel cleaning apparatuses 92 and 94 may operate and be configured in substantially the same manner. Consequently, only wheel cleaning apparatus 92 will be hereinafter described in detail.

Figure 2:
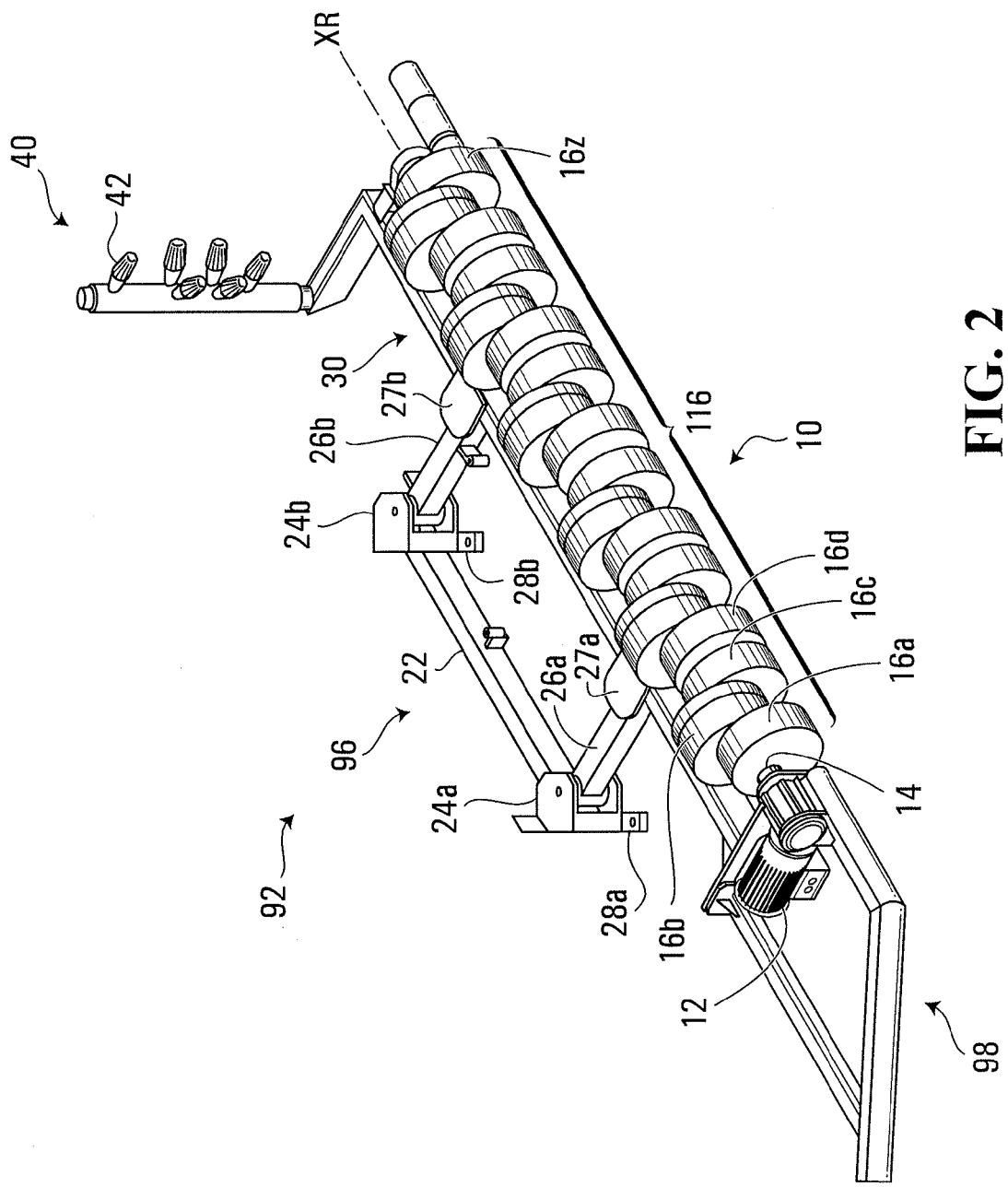
FIG. 2 is a perspective view of an embodiment of a tire cleaning system, showing the envelope of the brush components comprising one embodiment of the brush assembly.

Wheel cleaning apparatus 92 may have a support frame 96 that may be configured for example, as a parallelogram assembly, as depicted in FIG. 2. Parallelogram type support frame assemblies are known and are only one way of supporting a brush assembly that can accommodate vehicles of varying width. Such assemblies enable a brush portion of a brush assembly to be moved up to and apply pressure against the tires of a vehicle. A representative example of such an assembly is disclosed in U.S. Pat. No. 6,461,429 the contents of which are hereby incorporated herein by reference.

As a vehicle (not shown) approaches a wheel cleaning apparatus 92, a vehicle tire 56 (see FIG. 3) or the vehicle body (not shown), contacts an engagement arm 98, which may be attached to, or integrally formed with, support frame 96. Upon contact with engagement arm 98 by a vehicle tire 56, support frame 96 may be moved so that a brush portion of brush assembly 10 may contact a peripheral, outward facing surface area (referred to as the side wall) 52, and a rim 54 of the vehicle wheel 50. Similarly, wheel cleaning apparatus 94 may be positioned in a corresponding manner to engage a vehicle wheel on the other side of a vehicle.

With reference to FIG. 2, as referenced above, wheel cleaning apparatus 92 may include a support frame 96 that supports a brush assembly generally designated 10. The various components of frame 96 may be made from suitably strong and durable materials including metals, including steel, aluminum, stainless steel and other suitable materials.

Frame 96 may include a base member 22 oriented generally longitudinally parallel to the general direction of travel of the vehicle, and parallel to central longitudinal axis X-X. Base member 22 may be connected to attachment members 28a and 28b located at opposite ends of base member 22, to permit base member 22 to be mounted to a support mechanism or frame (not shown). For example, attachment members 28a, 28b may be mounted to support posts (not shown) that are supported on the floor of the wash plant.

Pivot assemblies 24a and 24b may be secured at opposite ends of base member 22, and also may be interconnected and secured to frame attachment members 28a, 28b respectively. Pivot assemblies 24a, 24b may be configured to permit respective pivot arms 26a, 26b to be attached and pivoted relative to base member 22 and attachment members 28a, 28b.

Frame 96 may also include a longitudinally oriented and extending brush support member 30 which may be oriented generally parallel to the ground and parallel to axis X-X. Brush support member 30 may be also attached at 30a, 30b to the distal end portions of respective pivot arms 26a, 26b with pivot assemblies 27a, 27b. Thus, when pivot arms 26a, 26b rotate about pivot assemblies 27a, 27b and 24a, 24b, the orientation of brush support member 30 may remain parallel to axis X-X, but brush support member 30 may move transversely inward and outward, and longitudinally forward and backwards.

It should be noted that various other support mechanisms may be used for brush assembly 10 so that the brush assembly is appropriately positioned to engage the wheels 50 of a vehicle.

The actual position of brush support arm 30 and the force applied by brush assembly 10 against the outward facing surface of a vehicle tire 56 and rim 54 may be controlled by respective pneumatic or hydraulic double acting cylinders with reciprocating piston rods or arms (not shown). An example of a suitable reciprocating cylinder system is the model D-96683-A-6 made by Bimba Manufacturing. The cylinder systems may be positioned between the pivot arms 26a, 26b and attachment members 28a, 28b, respectively. The movement of the pistons in the cylinder systems may be controlled by controlling the flow of hydraulic fluid or air to the cylinders, by the operation of electronic control valves such as valves made under model ACD03197 by Burkert Fluid Control Systems. Controller 99 (FIG. 1) may be in communication with the control valves to appropriately activate the control valves permitting control of the position and the force applied by a brush assembly 10 against the rim 54 and sidewall 52 of a vehicle wheel 50. It should be noted, however, that during cleaning of a wheel 50 by the brush assembly 10, while it is desirable to control and maintain fairly constant, the actual transverse position of the brush assembly relative to the wheel, the system controller 99 may effectively only be able to control the actual force applied by the hydraulic or pneumatic cylinders. Thus, the position of brush assembly 10 at any particular time during its rotation, may be determined by the transverse position required to generate sufficient force through the brush assembly components to exert on the wheel 50. The result for a brush assembly with non-uniform cross-section, is a "bouncing" motion towards and away from the wheel. However, as will be explained in detail hereinafter, some embodiments described hereinafter are able to account for any potential "bouncing" to optimize performance.

Figure 3:
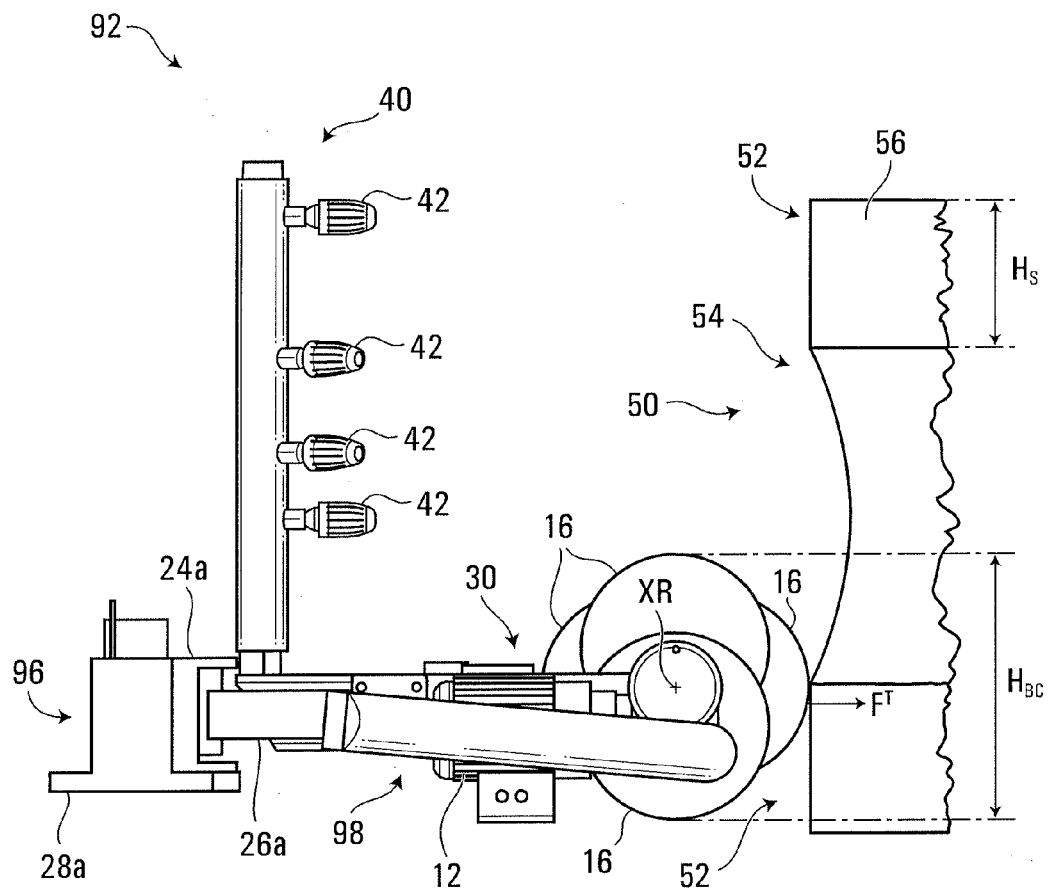
FIG. 3 is a left side view of the part of the system shown in FIG. 2.
Figure 4:
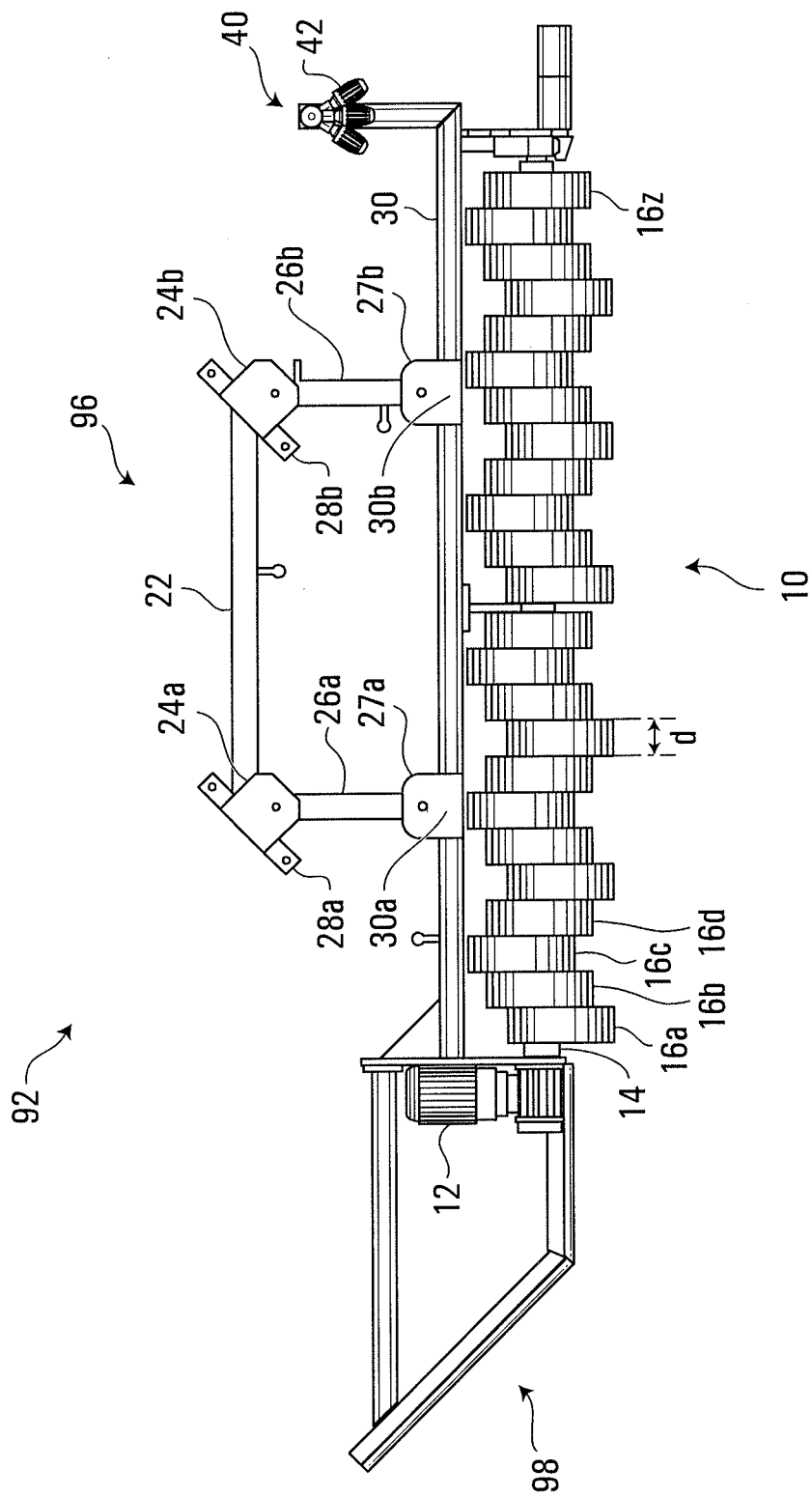
FIG. 4 is a plan view of the part of the system shown in FIG. 2.

Wheel cleaning apparatus 92 may also have a spray nozzle assembly 40 that may also be attached to frame 96. As depicted in FIGS. 3 and 4, spray nozzle assembly 40 may be attached to a brush support arm 30 and may be positioned and adapted so that a fluid may be drawn from a fluid supply and sprayed upon a vehicle tire 50 to facilitate rinsing of the vehicle tire 50. Additionally, a spray nozzle assembly 40 may be used to prepare a vehicle tire 50 for subsequent treatment operations in the wash facility. As a vehicle wheel 50 passes by a spray nozzle assembly 40, such a fluid may be sprayed from at least one spray nozzle 42 onto the vehicle wheel 50. The spraying of fluid from the spray nozzles may be controlled by valves (not shown) that may also be controlled by system controller 99.

As shown in FIGS. 2 and 3, a brush drive motor 12 may also be provided and may be attached to part of frame 96, such as brush support arm 30. A longitudinally aligned shaft 14 supported for rotation by brush support arm 30 about an axis XR, may be coupled to and rotated by motor 12. Shaft 14 may be made of any suitable material including a suitable metal such as for example steel, aluminum, or stainless steel. Motor 12 may be an electric motor such as a model SCAQ26-QH80M4U made by Siemens and may drive shaft 14 in rotation at a substantially constant speed. In other embodiments, motor 12 may be a variable speed motor. Depending upon the load on the brush, the torque applied by the motor 12 to shaft to create the desired rotational speed may have to be varied. The operation of motor 12 may also be controlled by system controller 99.

Figure 7:
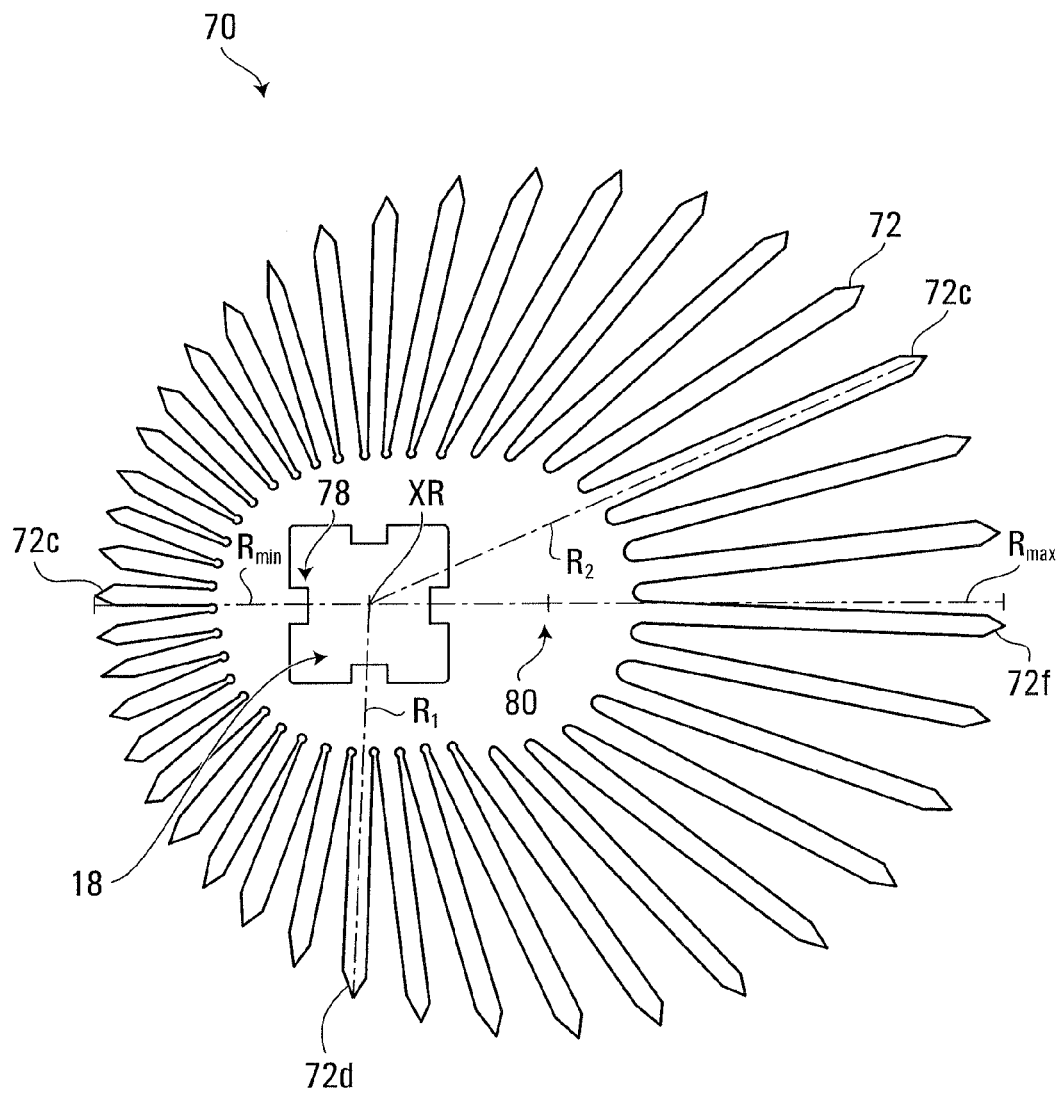
FIG. 7 is a side view of a brush segment for use with the embodiment illustrated in FIG. 6.
Figure 8:
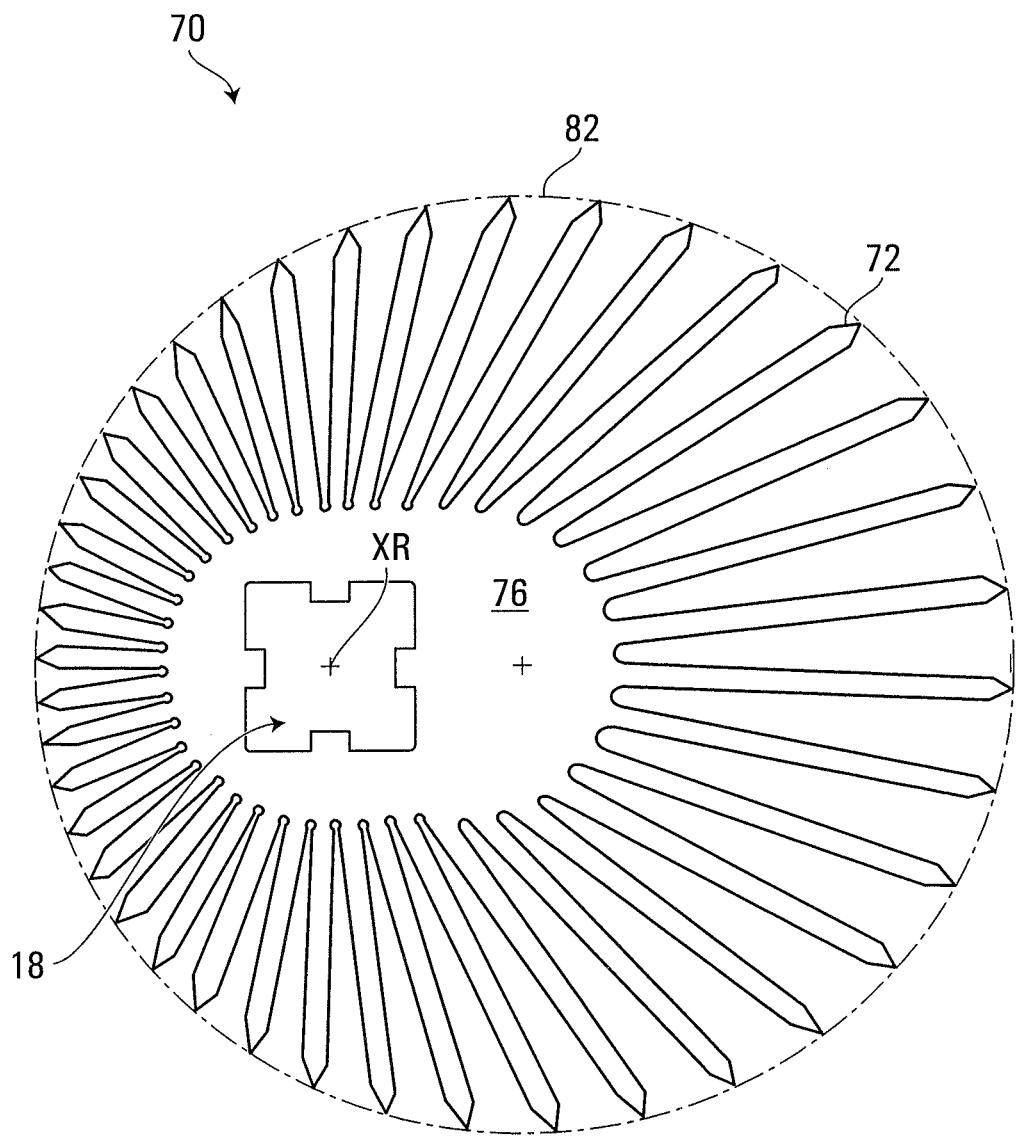
FIG. 8 is a side view of the brush segment shown in FIG. 7 showing the envelope of the brush segment.

Brush assembly 10 may be comprised of one or more brush components 16 that may be rotated about an axis parallel to axis X-X. Brush assembly 10 may in some embodiments, such as the embodiment illustrated in FIGS. 1 to 5, be comprised of a plurality of discrete brush components 16 that are positioned longitudinally adjacent to each other in sequence on shaft 14, but which may all rotate about the same common longitudinal axis XR. In FIGS. 1-5, only the envelope or profile of each brush component 16 is illustrated for clarity. The term envelope is used to describe the surface defined by linking the outermost extending portions of material forming the brush component 16, from the axis of rotation of a brush component 16 without taking into account recessed portions. Further details of one particular embodiment of a brush component 16, are illustrated in FIGS. 6-8, described below.

Figure 6:
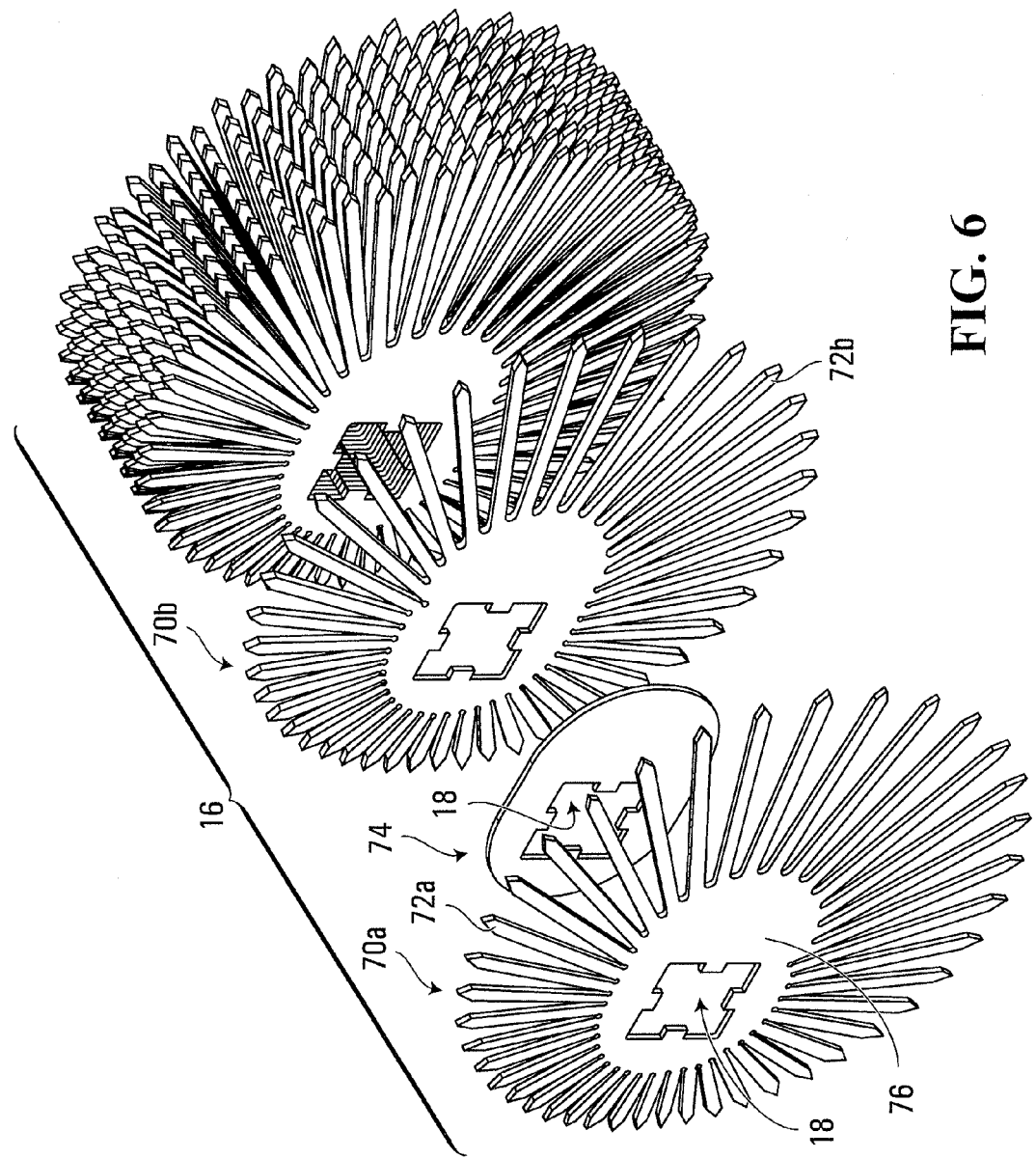
FIG. 6 is a partially exploded perspective view of one embodiment of a brush component that may be part of the brush assembly of FIG. 5.

In one embodiment each brush component 16 may be comprised of a plurality of brush segments 70, as depicted in FIG. 6. Each brush segment 70 may be formed from a unitary piece of material, such as a resilient closed cell foam, into a plurality of fingers 72 extending generally radially outward from a finger support core 76. A recessed portion may be provided between fingers 72 having varying shapes. Fingers 72 may also have a relatively constant width and height in cross section, along their length, but may have a distal end portion where their height is tapered to end in an approximately angular or wedge shaped point. The generally angular or wedge shaped point on the distal end of each finger 72 assists in the cleaning of the surfaces of the wheel. Wedge shaped points of each finger 72 also advantageously allow a relative soft and resilient material to be used while simultaneously allowing a sufficient cleaning force to be applied by each finger 72 and also allowing each finger 72 to effectively clean relative small surfaces.

Each finger may be configured with a cross section that is generally uniform and may be the same height and width throughout its length. Fingers 72 may be configured so that they have a relatively greater height H compared to their width W. By way of example only, a height H (FIG. 7) of about ¼ of an inch and a width W (FIG. 6) of about ⅛ of an inch may be utilized. Fingers 72 are oriented so that they generally engage a surface on a wheel, by bending transversely in a manner similar to a beam, the relatively larger height compared to the width, providing each finger with a relatively high rigidity compared to the bending rigidity about a vertical axis. Yet the selection of a suitable material such as for example a closed cell EVA foam material, means that the fingers will tend not to scratch a wheel rim made from an expensive metal such as for example chrome.

However, fingers 72 or other cleaning elements having other profiles may also be used in some other embodiments.

Closed cell foam, such as EVA foam, has been demonstrated to be an example of suitable material for the application, having sufficient stiffness/flexibility so that the finger elements can perform their cleaning function. Closed cell foam as used herein will be understood by persons skilled in the art to include foams where cells containing a gas are completely enclosed by a thin wall or membrane of material (eg. plastic). However, closed cell foam as used herein shall include materials generally closed of a closed cell foam but having an open celled surface texture to mechanically assist in cleaning surfaces. Other types of foam may also be employed depending upon the desired characteristics of the brush assembly 10. For example, foams currently used by MacNeil Wash Systems to clean vehicle panels may be modified to have an increased density and may provide adequate performance. Suitable performance has been achieved using a closed cell EVA foam having a density of between 12 to 14 pounds per cubic foot. The particular type of foam chosen should be soft enough so that it does not damage portions of a vehicle, yet provide sufficient rigidity to facilitate effective cleaning of vehicle wheels.

More generally a closed cell foam may be lightweight and flexible to reduce the magnitude of the rotating mass and allow a brush component to conform to a variety of contoured surfaces. The foam may also have a low surface energy to mitigate against dirt and debris being trapped on the foam surface. To accomplish effective cleaning, the foam may have a rough surface that is also non-abrasive to provide effective cleaning and also avoid damage (e.g. scratching) to vehicle panels. The foam may also have a thin cross-section, be durable, and resistant to chemicals commonly used in vehicle wash facilities. Alternatives to EVA (ethylene vinyl acetate) foam that may be suitable for some applications include polyethylene, PVC, and vinyl nitrile (PVC-NBR). Other suitable materials that have varying combinations of the properties noted above may also be used in some applications, including open foam cell materials and solid plastic bristle materials. For example, suitable cloth, felt, reinforced polyester materials, and other fabrics may be adapted to have similar properties to those described to advantageous above and may provide acceptable performance.

By providing a plurality of discrete, separate fingers 72, individual fingers 72 of a single brush component can engage a plurality of different surfaces of the tire side wall 52 and rim 54, to provide a more thorough cleaning of the wheel 50.

In the embodiment shown in FIG. 6, a brush component 16 may be constructed by also including a spacer 74 between adjacent brush segments 70. For example, spacer 74 may be positioned between brush segment 70a and brush segment 70b on shaft 14 (not shown in FIG. 6). Including spacer 74 between brush segment 70a and brush segment 70b may assist in preventing interference of fingers 72a of brush segment 70a with fingers 72b of brush segment 70b, which may improve performance when cleaning small or recessed surfaces. Including spacer 74 between adjacent brush segments 70 may also reduce the overall density of brush component 16, which reduces the overall rigidity of brush component 16. Each brush component 16 may also be less likely to act as a single unit with all fingers 72 in a particular region acting together on the same surface. Thus, individual fingers 72 will be more likely to act independently in engaging surfaces on a wheel 50. It should be noted that suitable performance has been achieved in an embodiment using an (EVA) closed cell foam material, with brush segments 70 and spacers 74 each having a Width W of about ⅛ of an inch.

The embodiment depicted in FIGS. 6-8 may have segments 70 with a generally circular envelope 82 defined by linking the distal ends of each of the fingers 72 in a segment 70. As noted above, the term envelope is defined by the surface linking the outermost extent or cross-section of a brush segment 70, without accounting for recessed portions. For example, in the embodiment depicted in FIGS. 6-8, the envelope 82 is defined by the ends or tips of fingers 72, without accounting for the recessed portions between fingers 72. Thus the envelope for the entire brush component 16 comprised of multiple segments, will be a generally circular, longitudinally extending cylindrical shape.

In FIG. 8, it is apparent that as you move around the envelope 82 of a segment 70, different portions of envelope 82 are located at varying radial distances from the axis of rotation XR. In the embodiment of FIGS. 6-8, the radial distances vary continuously around the envelope 82. Suitable performance may be achieved using fingers 72 that define a substantially circular envelope for each segment 70, having lengths extending from 3 to 7 inches from the axis of rotation XR and varying gradually and continuously around the periphery of a brush segment 70. Satisfactory performance may be achieved with a brush component 16 having a depth of in the range of 3 to 4 inches such as 3.5 inches (i.e. this "depth" is the length along the longitudinal axis) comprised of alternating brush segments 70 and spacers 74 each having a width of ⅛ of an inch with continuously varying finger lengths in the manner described above.

Brush components 16 having numerous other configurations may be used that provide elements such as fingers 72 that combine to exert variable pressure or force to a vehicle wheel 50 as the brush component is rotated and contacts a vehicle wheel. Optimal cleaning has been found to result with fingers 72 having different lengths. A finger 72 of a particular length and material provides optimal cleaning for surfaces that are located a certain distance away from the axis of rotation or other fixed surface. By having fingers 72 of different length 72, each finger also provides a different contact pressure to a surface, such as a vehicle wheel, to assist in providing optimal cleaning performance.

By way of further explanation, having multiple fingers 72 of varying length results in each brush segment 70 that is able to effectively clean a variety of surfaces that are located are varying distances from an axis of rotation or other fixed surface. This results from fingers 72 of different lengths contacting surfaces located at varying distances from the axis of rotation XR. This is particularly important for cleaning vehicle wheels, as vehicle wheels require aggressive cleaning and have surfaces located a varying distances from an axis of rotation XR. Thus, as the wheel 50 moves past the brush component 16, in a particular brush component 16, the chances of the different surfaces on the vehicle wheel being engaged by fingers having an optimum cleaning length is significantly enhanced, which may increase cleaning performance.

Thus, one feature that may contribute to the desired "scrubbing action" that may be achieved with wheel cleaning system 100 (FIG. 1) is the cyclical change in finger lengths that engage the wheel surface, as each brush component 16 is rotated on shaft 14.

In another embodiment, similar to that shown in FIG. 6, adjacent brush segments 70 of a brush component 16 may be configured so that fingers 72 are slightly angularly offset from each other. For example, fingers may be offset such that fingers of one segment 70 are substantially aligned with the gaps between fingers on an adjacent segment 70. With reference to FIG. 6, for example, segment 70b may be rotated relative to segment 70a so that fingers 72a are substantially aligned with the gaps between fingers 72b. Such an arrangement may further reduce the interference between the fingers 72 of adjacent brush segments 70 and may provide improved cleaning performance.

Each brush component 16 may have an aperture 18 to receive drive shaft 14. In certain embodiments, each brush segment 70 and spacer 74 comprising a brush component 16 may each have an aperture to receive drive shaft 14. Aperture 18 may be of any shape provided a brush component 16 may be coupled to and rotated by a compatible shaft 14. For example, an aperture 18 and a shaft 14 may both have corresponding square or polygonal cross-sections. Alternatively or in addition, an aperture 18 may have a protrusion 78 or a series of protrusions extending inwardly from the overall cross section of aperture 18 to assist in coupling brush component 16 to shaft 14. Other methods may be employed so that the corresponding size and shape of the outer surface of shaft 14 and the inner surface of aperture 18 provide sufficient resistance against the rotational forces resulting between the brush component 16 and shaft 14 when brush component 16 contacts a vehicle wheel 50. For example, the individual components 16 could be mechanically fastened directly to the shaft 14.

Thus, a plurality of brush components 16 may be mounted sequentially on shaft 14, and rotated by shaft 14 about its axis of rotation XR. The location of an aperture 18 in each component 16 provides the location on each brush component 16 about which the brush component will be rotated.

Each separate brush component 16 may be received on shaft 14 but may not be separately secured to the shaft to prevent longitudinal movement along the shaft. The series of components 16 that comprise the group of brush components 116 (FIG. 2) having specific opposed end brush components 16a and 16z, may be held in place by securing devices at either end. For example, at each end may be provided a locking pin received in an aperture in shaft 14, or a block that may be releasably secured around the shaft. Other methods of securing brush components 16 to shaft 14 are well known in the art, and may vary depending on the particular material chosen for an application.

The engagement of wheel cleaning apparatus 92 with a schematically depicted vehicle wheel 50 is illustrated in FIG. 3. A vehicle wheel 50 may be comprised of a tire 56 mounted upon a rim 54. A tire 56 may have an outwardly facing surface (i.e. side wall 52) that comprises an outer peripheral surface area portion of the tire 56. As shown, brush assembly 10 may be positioned to permit at least one brush component 16 to contact side wall 52 and rim 54 of a vehicle wheel 50, upon rotation of at least one brush component 16 by shaft 14. Depending upon the depth d (FIGS. 4 and 5) one or more brush components 16 of brush assembly 10 may simultaneously contact a vehicle wheel 50. Additionally, if a brush assembly 10 is comprised of multiple brush components 16, each of the brush components 16 may have the same or different depths d.

As illustrated in FIG. 3, the overall maximum height $H_{BC}$ of each brush component 16 can be varied to clean greater or lesser parts of a vehicle tire 50, or to suit the average tire size of vehicles washed in a particular facility. Similarly, the height of the brush assembly 10 may be adjusted to clean a desired portion of the rim 54 and side wall 52 of a vehicle tire 50. For example, brush height $H_{BC}$ may be in the range of about 11" to about 15" such as about 14 inches, for common wheel sizes having an overall diameter in the range of about 22 to 30 inches and a side wall height Hs in the range of about 2.5" to about 5". The brush may be positioned so the lowest point of envelope for the foam fingers is about 1" of the ground.

As discussed above, one feature that may contribute to the desired "scrubbing action" is the cyclical change in finger lengths that engage the wheel surface, as each brush component 16 is rotated on shaft 14. Another feature that may contribute to the desired action is providing a cyclical change in the contact pressure exerted at each point of contact between the fingers 72 and the contacted surface of the wheel 50. By way of explanation, in an embodiment of a tire cleaning apparatus 92, the pneumatic or hydraulic cylinders will cause brush assembly 10 to exert a force against the wheel 50 or wheels of a vehicle. The total force of brush assembly 10 will be transmitted through the individual brush components 16 that engage one or more wheels 50. However, the generally transversely directed force $F^T$ (FIG. 3) exerted by each brush component 16 against a vehicle tire 50 will be transmitted to the wheel 50 through the addition of all the individual fingers 72 exerting forces on surfaces of the wheel. Given the configuration of each brush component 16, the force exerted by each particular brush component 16, each brush segment 70 and each finger 72, may vary as the rotational position of the brush component 16 is varied. It should be noted that the difference in spacing of the end portions of the fingers (and thus the number of engaging fingers) causes the force that is applied to vary. Additionally, the length of the finger and the distance from the core where a location on a finger engages a surface on the wheel contribute to the variation of the force transmitted to the wheel 50. Moreover, the magnitude of depth d of a brush section 16 may also play a role in determining the extent of the contact area between fingers 72 in each brush section, and thus the total force being imparted by each brush section 16 on to the wheel 50.

The total force applied by the overall brush assembly 10 may be controlled in part by system controller 99 communicating with valves to control the hydraulic or pneumatic cylinder system (not shown).

An embodiment that may cause a brush component 16 to impart a force to a vehicle wheel 50 that varies as the brush component 16 is rotated may be accomplished by appropriately positioning an aperture 18 of the brush component 16. As previously noted, the position of an aperture 18 defines an axis of rotation, around which a brush component 16 may be rotated by a shaft 14. Specifically, an aperture 18 may be positioned so that the end of each finger 72, or more generally the envelope of a brush component 16, is located at a variable radial distance from the axis of rotation XR defined by shaft 14, upon which brush component 16 is mounted. Upon rotation of a brush component 16 having an envelope, for example the ends of fingers 72, located a variable radial distance from an aperture 18, the effective radius of the brush component 16 may be varied.

Thus, if the relative transverse positions of a vehicle tire 50 and shaft 14 is held constant, during rotation of brush component 16, the non-deflected radial distance of each finger 72, or more generally the envelope of brush component 16, from the axis of rotation XR will vary. If the envelope of brush component 16 is in contact with the vehicle wheel 50 during at least part of the rotation of brush component 16, the transverse force imparted by each brush component 16 to vehicle wheel 50 will be varied.

By way of further explanation, if vehicle wheel 50 were located a fixed distance away from the axis of rotation of shaft 14 and brush component 16, a greater force is imparted by fingers 72, or more generally segments of the envelope of the brush component 16, having a greater non-deflected radial distance from the axis of rotation XR. Similarly, fingers 72 or segments of the envelope of a brush component 16 having a relatively small non-deflected radial distance from the axis of rotation, will impart a lesser force to a vehicle wheel 50, compared to segments of the envelope located a relatively large radial distance from the aperture 18. This may be because when a relatively longer finger finger 72 engages a surface of a wheel, a relatively greater amount of bending and associated deflection of that finger is imparted by and on the finger (ie. a larger force is required to create a larger bending deflection).

The result of the foregoing may be that if the force applied from the cylinders is substantially constant, the brush component would have to continuously adjust its position to provide for a constant force. However, the actual forces that will be applied to the brush component by the cylinders can be controlled by control system 99 so that the position of the brush component will be held constant by varying the forces. This alteration in force applied to the brush component under the control of system 99 is made easier because the forces will be cyclic.

With specific reference to the brush segment 70 illustrated in FIG. 7, the radius R2 represents the distance to the peripheral edge of finger 72c and radius R1 represents the distance to the peripheral edge of finger 72d. If the segment core 76 and shaft 14 remain at a fixed distance to a surface on a wheel, finger 72c may impart a greater force to a vehicle tire 50 than finger 72d, because the end of finger 72c is located a greater radial distance from the axis of rotation XR than the end of finger 72d. The result may be that for finger 72c a greater force is required to achieve appropriate bending deflection of finger 72c compared to finger 72d.

As an aside, it should be noted that in some embodiments, at least one or more portions of the envelope of a brush component 16 having a relatively short radial distance to an aperture 18 may not come into contact with a vehicle wheel 50 at all during rotation. The analysis of the actual forces being applied between particular fingers and wheel surfaces may however also be further complicated because a wheel that is fixed transversely, may itself have wheel surface portions with varying distances from the brush assembly.

Nevertheless, brush components 16 having an envelope 82, such as is defined by linking the tips of fingers 72, that are located a varying distance from the axis of rotation XR, are suitable for cleaning a vehicle wheel 50. A vehicle wheel 50 has many surfaces that are located at varying distances from the axis of rotation XR. For example, a rim 54 may be concave having its surface located a greater distance from the axis of rotation than parts of a side wall 52. Similarly, even parts of a rim 54 itself, such as spokes, may be located at different radial distances from the axis of rotation XR compared to areas of the rim between the spokes.

Generally, it has been found that the ends or tips of fingers 72 are responsible for a substantial part of the cleaning efficacy of a particular finger 72. Further, each finger 72 may be optimally effective to clean a surface located a particular distance away from the axis of rotation XR where the ends or tips engage the surfaces. The particular distance where optimal cleaning may be achieved will vary depending upon factors such as the length of the finger 72 and also the material used to construct the finger 72.

As noted above, brush component 16 may be comprised of brush segments 70 having fingers 72 of varying length located around the periphery of brush segment 70 and in a plane transverse to the axis of rotation XR. Such a brush component 16 has an envelope 82 defined by the tips of fingers 72 with varying radial distance from the axis of rotation XR. Having fingers 72 ending at continuously varying radial distances from the axis of rotation XR, to define an envelope 82 having a continuously varying radial distance from the axis of rotation XR may increase performance of brush component 16. The radial distance of fingers 72 may vary from Rmin to Rmax, as shown in FIG. 7. This may result in a brush component 16 able to more effectively clean a wide variety of surfaces located at different distances from the axis of rotation XR, than possible with conventional wheel cleaning systems. The ability to effectively clean surfaces located at different distances from the axis of rotation XR is particularly important when cleaning wheels because many surfaces of a vehicle wheel 50 are located at different distances from the axis of rotation XR and require an aggressive cleaning action.

As depicted in an embodiment as shown in detail in FIGS. 6-8, a brush component 16 having a generally circular or cylindrical profile may be used to contact a vehicle wheel 50. A brush component 16 having a circular envelope, having an aperture 18 offset from the centre axis of the brush component 16, with the shaft 14 being held in a fixed transverse position, may result in a gradually and continuously varying generally transverse force applied to a vehicle wheel 50 by each brush component, as the brush component 16 is rotated, which may be advantageous in certain applications. For greater certainty, the term centre axis refers to an axis located at the centre or centroid of an envelope, for example the centre of a circle where the envelope is circular. In the particular embodiment illustrated in FIGS. 6-8, each brush segment 70 has a plurality of fingers 72 terminating in an envelope 82 having a varying distance from the axis of rotation XR and may result in a gradually continuously varying force being applied as the brush component 16 is rotated. Elliptical profiles can also be used, as can other profiles that cyclically change the length of the fingers, and which may be in a manner where the changes is gradual and/or continuous. However, the most uniform change in the finger lengths may be achieved with a circular profile and offsetting the axis of rotation from the centre axis.

By appropriate selection of the profile and axis of rotation, the brush can exert during rotation, a gradual and continuous change in pressure.

As an aside, it should also be noted that a profile formed with an envelope that is generally circular in shape may provide advantages in manufacturing and assembly.

There are many alternate configurations of a brush component 16 that may be used to impart a variable force from a brush component to a vehicle wheel 50 as the brush component 16 is rotated. With reference again to FIGS. 6-8, aperture 18 may be located offset from the centre 80, or centre axis, of each brush segment 70 and spacer 74. The centre of a brush segment 70 or brush component 16 defines a centre axis around which brush segment 70 or brush component 16 would be rotated if an aperture was located at this position. Effective performance has been achieved with a circular envelope of diameter of about 10 inches, using an offset of 2 inches, resulting in fingers 72 terminating at radial distances varying from 3 inches to 7 inches from the axis of rotations XR around the envelope of each brush segment 70.

A variable force may also be imparted to a vehicle wheel 50 by a brush component 16, in other ways. For example, a brush component 16 having an aperture 18 positioned at the centre of an envelope having an elliptical shape may also impart a variable force on to vehicle wheel 50. Such a brush component 16 may or may not have fingers 72 and also may or may not be comprised of smaller units such as brush segments 70 and spacers 74. For example, a brush component 16 may be comprised of a plurality of bristles for certain applications configured to have an envelope located at varying radial distances from the axis of rotation XR, in a plane transverse to the axis of rotation. Similarly, any brush component 16 having an envelope comprised of elements with distal ends having a variable radial distance from its axis of rotation, may achieve a similar effect, and may be tailored to suit a particular application. As described below in detail, when brush components with distal ends defining ending at varying radial distances from an axis of rotation are used, the "bouncing" affect should be accounted for to optimize performance. For example, brush components could be mounted out of phase as described below.

Returning to FIGS. 2 and 4, it will be noted that brush assembly 10 may have a plurality of brush components 16, each having a thickness "d", which are illustrated schematically to show the envelope of each brush component 16. The thickness "d" of brush components 16 may be approximately constant, or may vary. Additionally, while each of the brush components 16 mounted on shaft 14 may be identical, adjacent brush components 16 may be oriented on shaft 14 so that they are out of phase with each other. When referring to a brush component 16 being out of phase, this terminology is used to describe the situation where two brush components 16 rotating through the same path have different angular positions. For example, as depicted in FIG. 2, brush component 16a is said to be out of phase with brush component 16b, as they each have a different angular position. In order for two brush components 16 not to be out of phase they would both occupy the same angular position at any given time.

Positioning adjacent brush components 16 to be out of phase with each other has been found to be desirable to assist in controlling the total amount of force exerted by the brush assembly 10 to vehicle wheels. Different portions of brush component 16 located at different distances from an aperture 18 impart different forces to a vehicle wheel 50 as brush component 16 is rotated. For example, with reference to FIG. 7 which illustrates a single brush segment 70, a first brush component 16 may be oriented so that at a particular point in time, it has segments 70 with longer fingers like 72f engaging a portion of wheel surface, and a second adjacent brush component may be oriented at 180 degrees out of phase with the first brush component, so that the second brush component has segments with shorter fingers like fingers 72e which are at the same time engaging an adjacent surface on the wheel. Depending upon the configuration of the wheel surface (i.e. it may not be uniform) the first brush component may be likely to exert a greater force on the wheel than the second brush component at that time.

It will therefore be appreciated that by positioning several brush components 16 out of phase with each other and having a plurality of such brush components 16 engage a wheel at the same time, a relatively constant average force can be applied by the brush assembly 10 to vehicle wheels as the brush assembly 10 is rotated facilitating the control of the force applied to a vehicle wheel, without the brush assembly having to make large transverse movements. Thus, the "bouncing effect" described above can be minimized or substantially eliminated.

If brush components 16 are chosen to have a depth (ie. distance in longitudinal direction), in the range of about 3 to 4 inches, then four brush components, each out of phase with adjacent components by 90 degrees, may engage the wheel at the same time. This can provide a good counterbalancing effect between all the brush components to provide a relatively steady transverse force without having significant transverse movement of the assembly.

As depicted in FIG. 2, and by way of further explanation, adjacent brush segments 16 may be positioned to be out of phase. Even where a brush assembly 10 is comprised of a plurality of brush components 16 each having a generally circular envelope and an aperture 18 offset from the centre axis of brush components 16, adjacent brush components 16 may be configured to be out of phase. In such an embodiment, the phase of a brush component 16 may be adjusted relative to another brush component 16, through rotation of one brush component 16 relative to the other brush component 16 prior to insertion of a shaft 14. In such an embodiment, replacement and manufacturing of brush components 16 may be simplified, resulting from the fact that all brush components 16 comprising a brush assembly 10 are identical. The outer surface of shaft 14 and the inner surface of brush component 16 and aperture 18 can be formed so that adjacent brush components can readily be positioned out of phase relative to each other.

One particular embodiment that has been demonstrated to be useful, consists of a brush assembly 10 where each brush component 16 is configured to be 90 degrees out of phase with adjacent brush components 16, with a combined group of four adjacent brush components having a total depth configured relative to a vehicle wheel so that they all engage a wheel at the same time. Such a configuration may be accomplished employing a shaft 14 and the inner surface of component 16 at aperture 18 having complimentary square cross-sectional shapes. Such a configuration may assist in controlling a brush assembly 10 so that a relatively constant force is applied by a brush assembly 10 to a vehicle wheel 50, without the bouncing motion described above.

Figure 5:
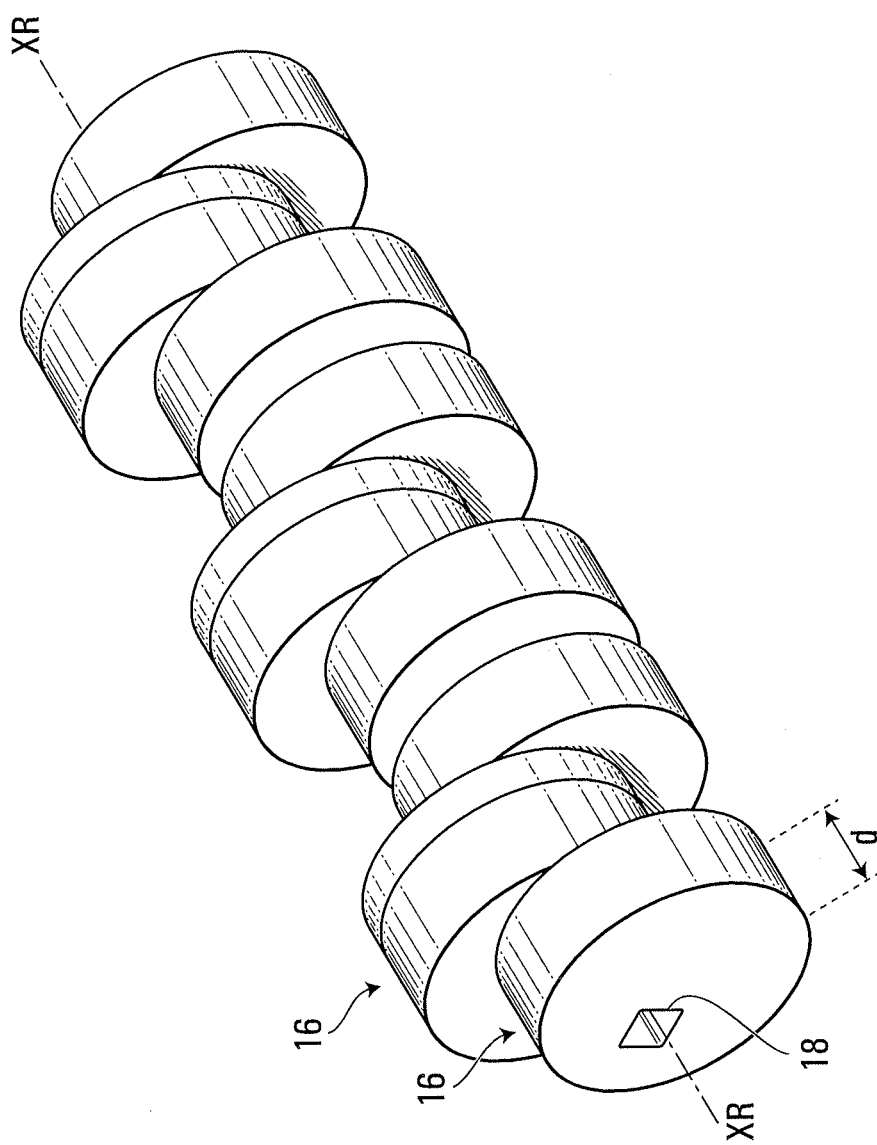
FIG. 5 is a schematic perspective view of an embodiment of a brush assembly that may be employed in the system of FIG. 1.
Figure 5A:
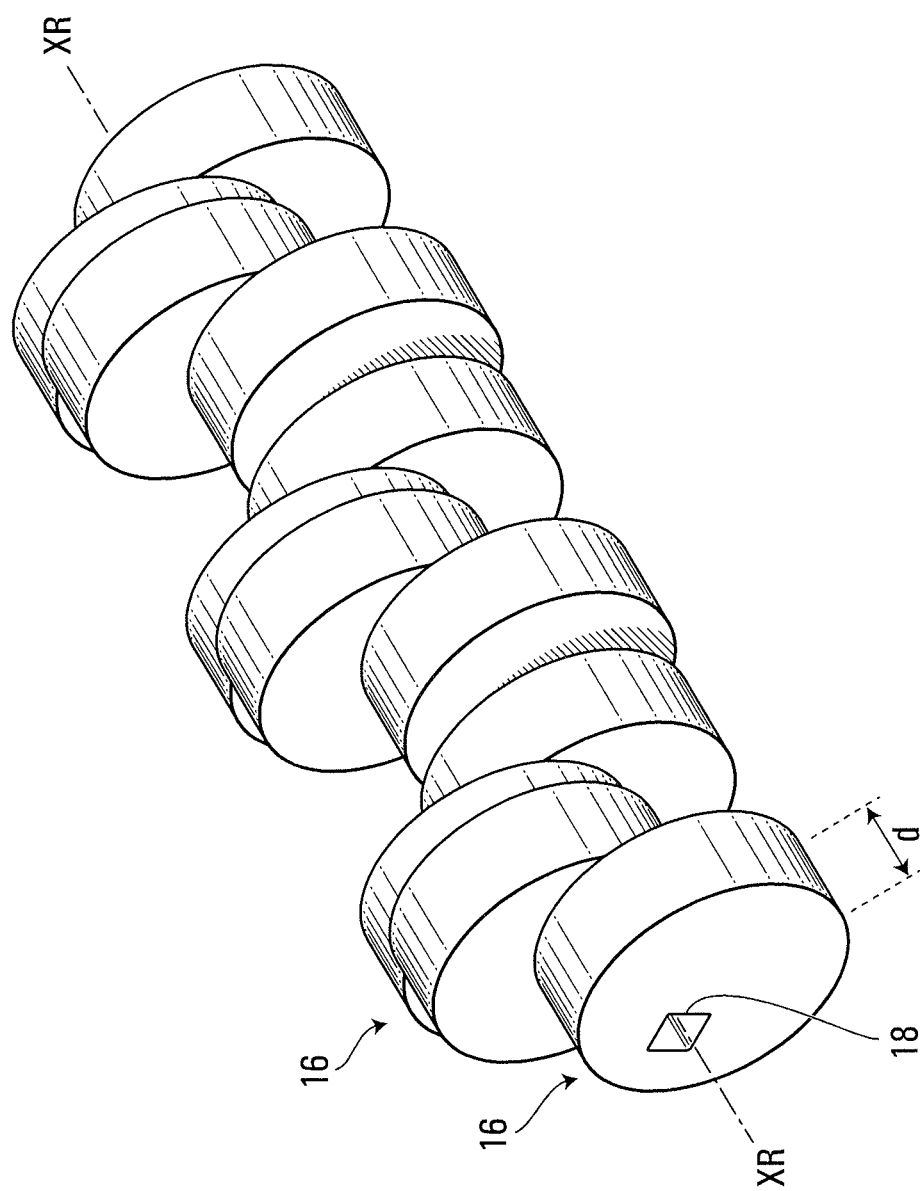
FIG. 5*a* is a schematic perspective view of another embodiment of a brush assembly that may be employed in the system of FIG. 1.

FIG. 5a depicts an example embodiment of a brush assembly with each brush component 16 configured to be 90 degrees out of phase with adjacent brush components 16.

A brush assembly 10 may also be comprised of brush components 16 having varying envelopes (i.e. the brush components 16 comprising brush assembly 10, may be shaped differently). For example, a brush assembly 10 may be comprised of brush components 16 having generally circular and elliptical envelopes. Similarly, a brush assembly 10 may be comprised of brush components 16 having varying depths 20, without departing from the scope of the invention.

In operation, a vehicle wheel 50 may contact engagement arm 98 as it progresses through a vehicle wash plant. Engagement by a vehicle wheel 50 with an engagement arm 98 may cause a brush support arm 30 to be moved so that a brush assembly 10 may engage a vehicle wheel 50. Alternatively, system controller 99 may be triggered by other sensors to cause the various components of wheel cleaning apparatus 92 to become operational.

With particular reference to FIGS. 1-4, as a vehicle (not shown) moves forward relative to wheel cleaning apparatus 92, the plurality of brush components 16 may be rotated by a shaft 14 driven by a motor 12. The rotational speed of brush components 16 may be in the range of 150 to 170 revs/min. Typically, in a conveyor type wash plant, a vehicle may be moved past a wheel cleaning apparatus 92 at a relatively slow and uniform velocity (e.g. 34 ft/min). As a vehicle wheel 50 having a diameter in the range of about 22 to about 32 inches engages tire cleaning apparatus 92, a leading subset of brush components 16 (e.g. 16a, 16b) may engage the rim 54 and side wall 52 of the vehicle wheel 50 to start to clean the vehicle wheel 50. As the vehicle wheel 50 is rotated, and the vehicle moves forward, various other portions of the vehicle wheel 50 will be engaged by others of brush components 16a-16z, sequentially. It will be noted that brush components 16a-16d form a first sub-group, with each being 90 degrees out of phase with the adjacent brush components.

It should be noted that various modifications to the foregoing are within the contemplated scope of the invention. By way of example only a desired variable force could be applied to the vehicle wheel by providing a brush component configured in such a manner that the material make up throughout the component is not constant.

The foregoing type of wheel-cleaning systems may also be employed in "rollover" type wash systems with suitable modification to provide a combination of relative motion that changes the effective length of the finger that engages the wheel, and relative motion that creates changes in contact pressure between the brush and the wheel. This configuration may also create an enhanced "scrubbing" action to clean a wheel.

By way of example only, an alternative embodiment that may be suited for use in a "rollover" type wash system is shown in FIGS. 9-16. "Rollover" type wash systems are well known in the art, and generally include components that move relative to a stationary vehicle to treat the vehicle in several different ways such as washing, rinsing, waxing etc. For example a roll over system 250 may be controlled by a system controller 199 (such as the model CCS4500 of MacNeil Wash Systems). System 250 may also include a frame 252 (e.g. an overhead gantry) that is able to move longitudinally, such as for example on rails 254 affixed to the floor. In a rollover type wash system like system 250, the frame 252 may move longitudinally on rails 254 relative to a stationary longitudinally oriented vehicle so that brushes (not shown) or spray nozzles (not shown) may progress past and apply treatments to different portions of a stationary vehicle (not shown). An example of a typical rollover wash system is disclosed in U.S. Pat. No. Re. 33,334, the contents of which are hereby incorporated herein by reference.

Figure 9:
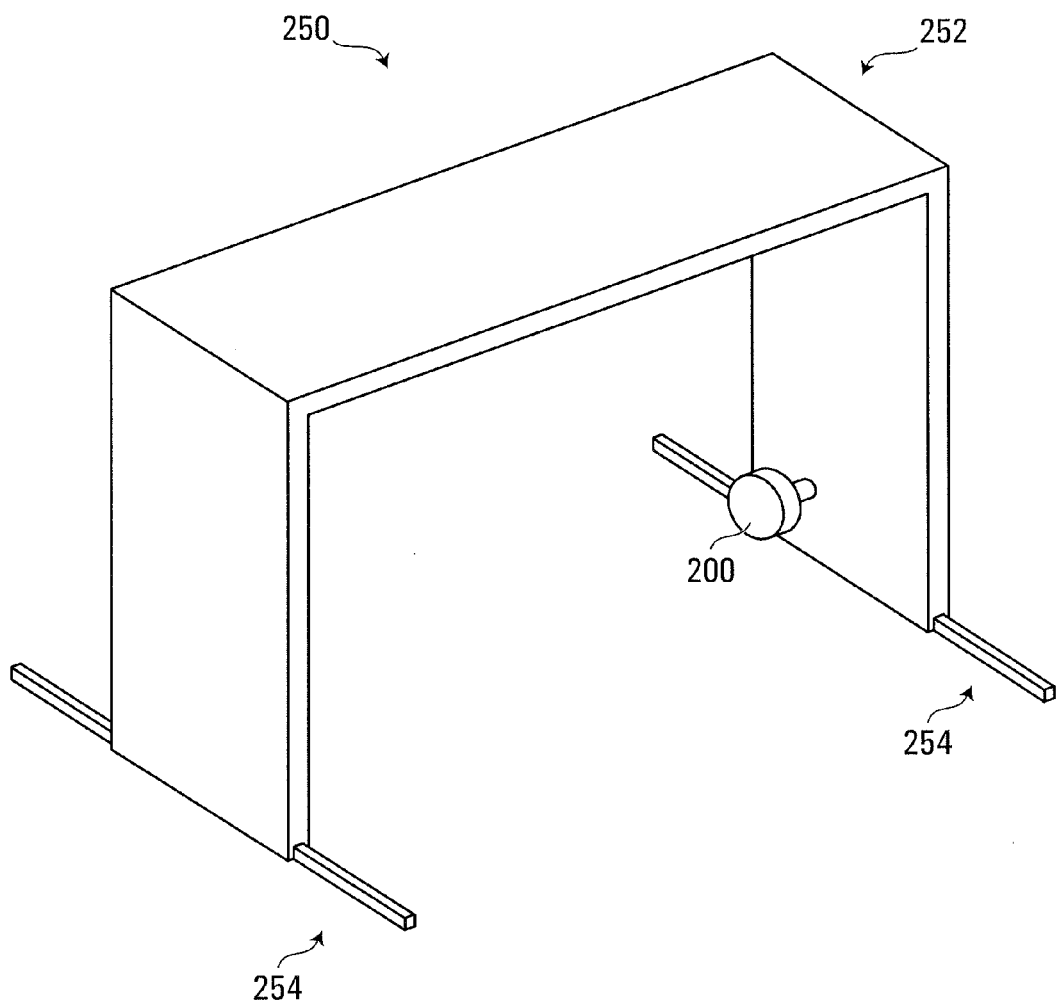
FIG. 9 is a schematic perspective view of a second embodiment of a tire system shown with selected components of a "rollover" type wash system.

With particular reference to FIG. 9, a wheel brush assembly 200 is shown mounted to frame 252 that may be used in a "rollover" type wash system. Other details of a typical "rollover" wash system such as panel brushes, liquid applicators, and a drying section are not shown in FIG. 9 for simplicity.

Figure 10:
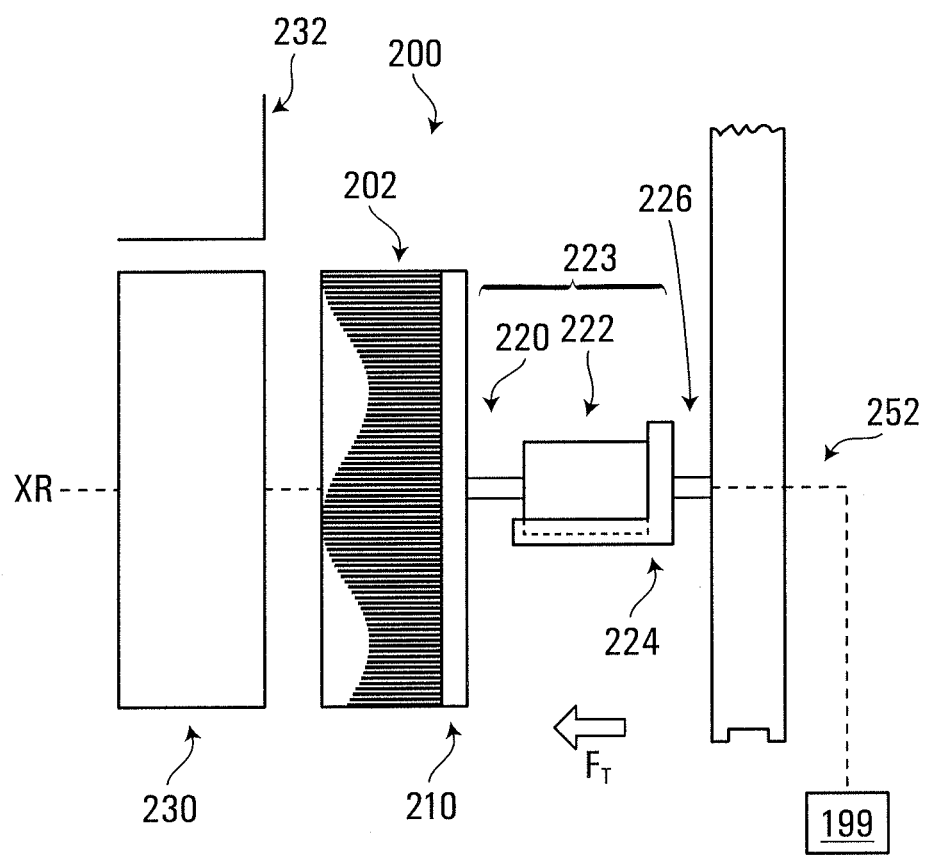
FIG. 10 is a schematic side view of the embodiment shown in FIG. 9.

However, further details of other components of system 250 are shown schematically in FIG. 10. Brush assembly 200 may be comprised of a plurality of transversely extending cleaning elements, such as resilient fingers 204, that may be attached to a generally circular disc shaped back plate 210. Back plate 210 may be oriented generally vertically such that fingers 204 may extend horizontally transversely. Each of fingers 204 may be affixed to back plate 210 for example with a suitable adhesive. The outer peripheral edge of fingers 204 may be larger than the outer diameter of the vehicle wheels that are desired to be cleaned.

A drive assembly 223 may be comprised of a motor 222 and shaft 220, coupled together so that motor 222 may drive shaft 220. Shaft 220 may be coupled to back plate 210 so that rotation of shaft 220 by motor 222 may rotate brush assembly 200 against the generally outward facing surfaces of a vehicle wheel 230. Motor 222 may be an electric or hydraulic motor. Motor 222 may be secured to a mounting bracket 224. Mounting bracket 224 or a similar apparatus may take different forms to provide a stable and secure mount to and with motor 222.

Mounting bracket 224 may be connected to frame 252 via an actuator 226. Actuator 226 may be operative to vary the axial position of, and/or force applied to brush assembly 200, independently or in conjunction with a system controller 199. One particular example of an actuator 226 that can be employed is a cylinder that may be a hydraulically or pneumatically activated double acting piston that permits the transverse position of brush assembly 200 to be axially varied along an axis of rotation XR and/or may control and vary the generally transversely directed force $F^T$ that can be applied to brush assembly 200. Actuator 226 could be controlled by valves (not shown) controlled by system controller 199.

Other examples of arrangements that can be used or readily adapted for mounting a brush assembly such as assembly 200 to a supporting frame such as frame 252 are substantially disclosed in U.S. Pat. Nos. 4,192,037 and 4,878,262 the contents of which are hereby incorporated herein by reference.

The total transversely directed force $F^T$ may be transmitted from actuator 226 through the individual fingers 204 to a wheel 230. Once contacting the wheel 230, varying the axial position of brush assembly 200 may affect the force $F^T$ applied to the generally outward facing surfaces of the wheel by fingers 204.

Other methods and apparatus for translating brush assembly 200 along transverse axis XR may also be used that are capable of withstanding the reactive force applied when the brush assembly 200 is brought into contact with the outer peripheral surface of a vehicle wheel 230. System controller 199 may control the transverse position of brush assembly 200 and monitor the force applied by brush assembly 200.

Additional details of brush assembly 200 are shown in FIGS. 11-16. Brush assembly 200 may be comprised of a brush cleaning segment 202 and back plate 210. Cleaning segment 202 may be comprised of the plurality of fingers 204 each attached to back plate 210. A shaft 220 may be securely attached to back plate 210 so that brush assembly 200 is rotated about axis XR (the transverse axis of rotation of shaft 220).

Figure 14:
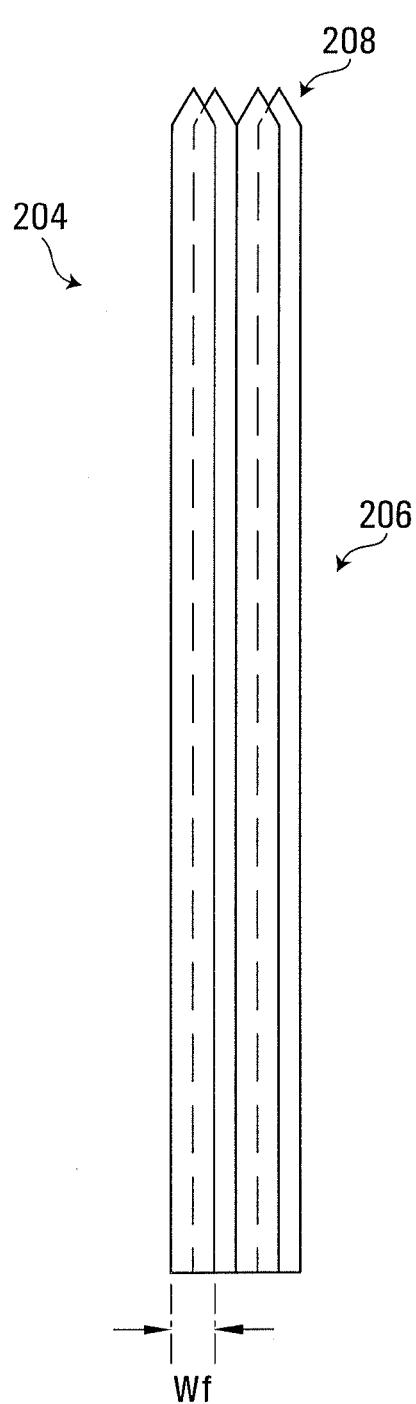
FIG. 14 is a front view of an embodiment of a finger suitable use as part of the brush component shown in FIG. 11.
Figure 15:
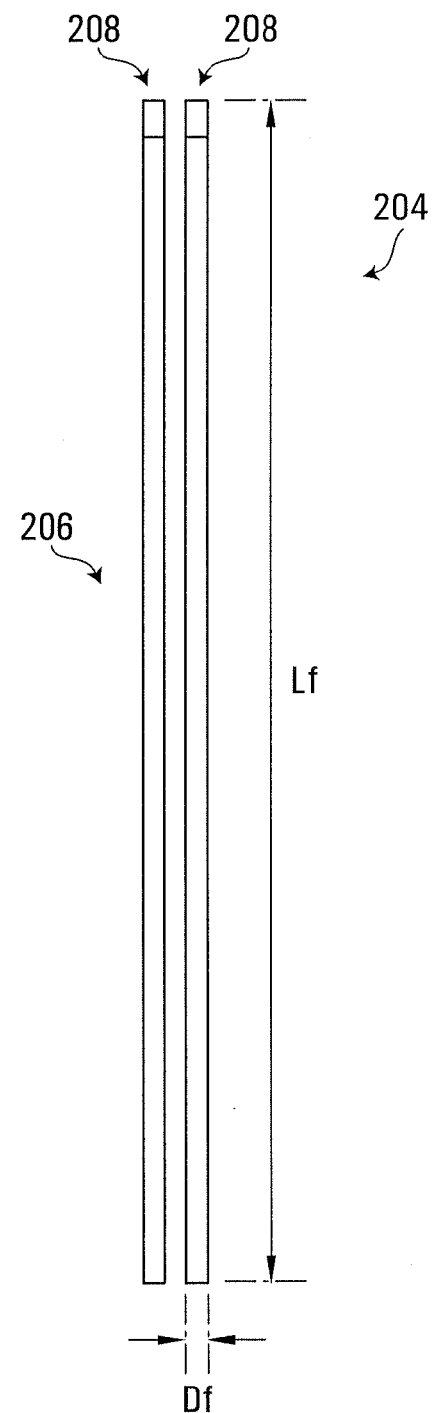
FIG. 15 is a side view of the finger shown in FIG. 14.

Fingers 204 may be attached to back plate 210 so that fingers 204 are mounted parallel to transverse axis of rotation XR. As shown in FIGS. 14 and 15, each finger 204 may be comprised of a body portion 206 and a tip 208. Tip 208 may be pointed or wedge shaped so that finger 204 may be able to clean relatively small surfaces while being of sufficient rigidity to transmit an effective cleaning force. The peak of tip 208 may be oriented to be tangential to a radial axis extending from the axis of rotation. Other orientations of tip 208 or other configurations of tip 208 may also provide effective performance depending upon the material chosen and particular application.

Fingers 204 may be comprised of a closed cell foam, such as EVA foam, and may have the same or similar properties previously considered to be advantageous as described above, including that the foam be lightweight, flexible, have a low surface energy and be relatively durable, etc.

With reference to a pair of fingers 204 shown in FIGS. 14 and 15, each finger may have a width Wf, depth Df, and length Lf. Width Wf and Depth Df of body portion 206 should be greater than same of tip 208 for optimal cleaning. Wf may be in the range of ¼"-⅜" and Df may be in the range of ⅛"-¼". The ratio Wf to Df may be in the range of 1.5 to 2. For example effective performance may be achieved having with fingers having a width of approximately ¼ inch and depth of approximately ⅛ inch. Lengths Lf of individual fingers may vary, and may for example vary from about 3 inches for shortest fingers to about 7 inches for the longer fingers.

Individual fingers 204 or subsets of a plurality of fingers 204 may have different lengths Lf. Having fingers 204 with non-uniform lengths Lf may increase the performance of brush assembly 200. Similar to the apparatus previously described, a finger 204 may provide enhanced cleaning performance for wheel surfaces that are located a specific distance away from back plate 210. Cleaning efficacy of a finger 204 may be decreased for distances other than at the optimal distance. This may result from a finger 204 providing optimal cleaning performance when a certain pressure is applied so that finger 204 is bent an optimal amount.

A brush assembly 200 comprised of a plurality fingers 204 where a subset of fingers having different lengths Lf may increase the performance of brush assembly 200. Having fingers 204 of different lengths Lf may enable brush component 200 to provide improved cleaning performance for wheels that have surfaces located at varying distances from backing 210. Such a configuration increases the likelihood that a particular surface will be cleaned by a finger 204 having an optimal cleaning length for said surface. This is particularly important for vehicle wheels since vehicle wheels have a variety of surfaces located at varying distances from backing 210 and require aggressive cleaning.

Figure 11:
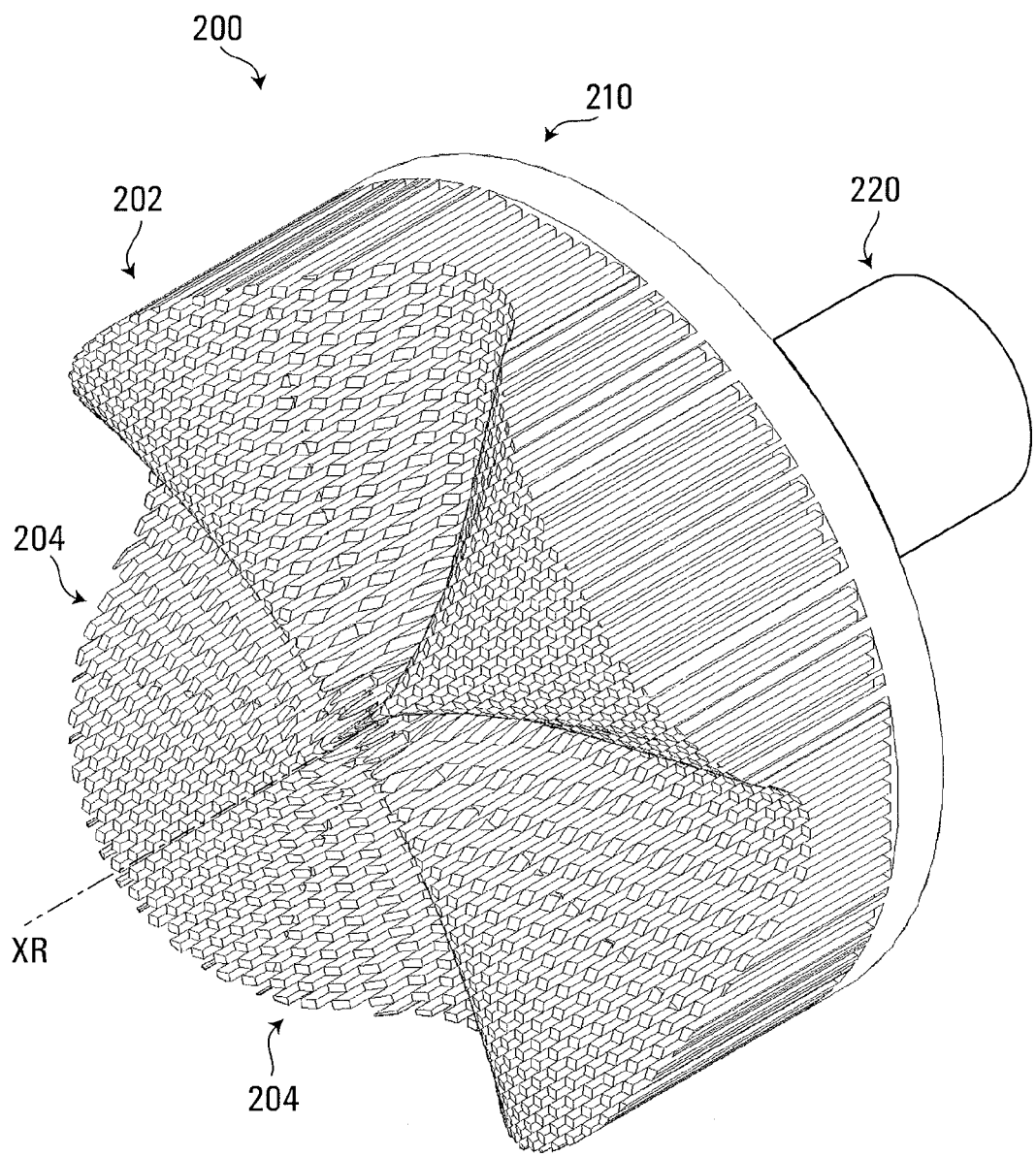
FIG. 11 is a perspective view of an embodiment of a brush component suitable for use in a "rollover" type wash system.
Figure 12:
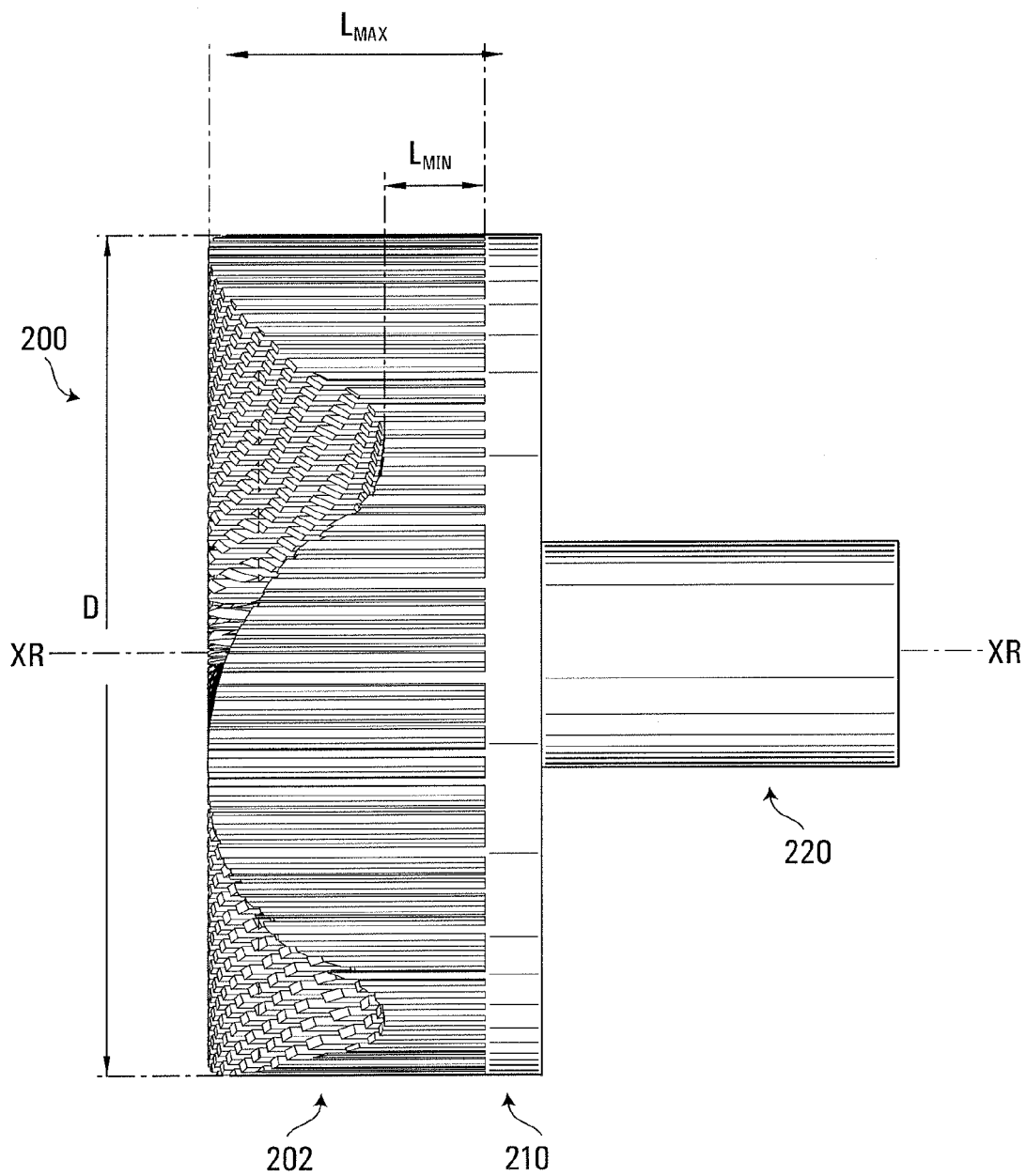
FIG. 12 is a side view of the embodiment shown in FIG. 11.
Figure 13:
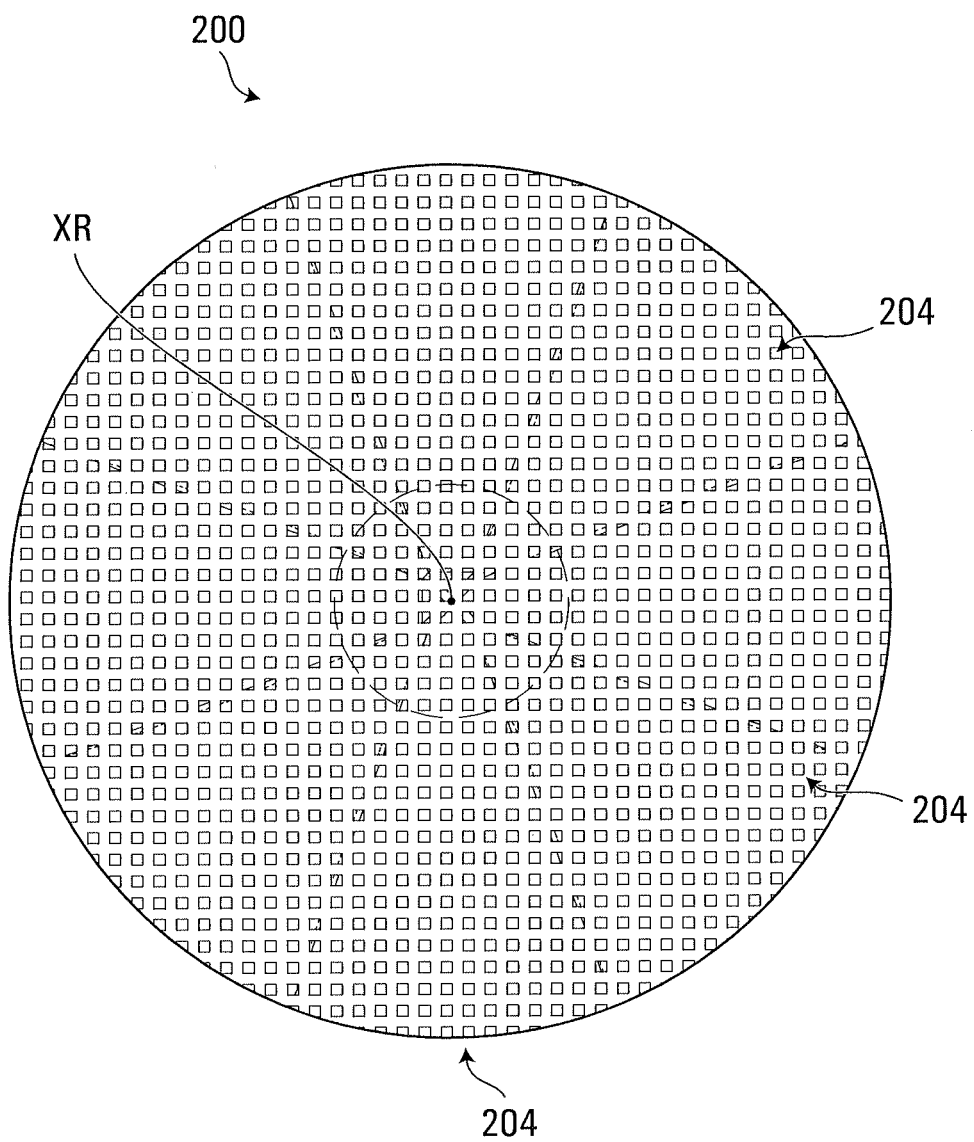
FIG. 13 is a plan view of the embodiment shown in FIG. 11.

Suitable performance may be achieved having fingers 204 or a subset of fingers that vary in length from 3 inches (Lmin) to 7 inches (Lmax). The length of fingers 204 may be varied in a variety of different ways. For example, the length Lf of a subset of fingers 204 may vary with the radial distance extending from the axis of rotation XR. Similarly, the length Lf of a subset of fingers may vary with the azimuthal angle of a particular finger Lf. The azimuthal angle as used herein refers to the angle used to designate coordinates in a polar coordinate system where points in a plane are defined by their radial distance from the origin and azimuthal angle. Alternatively, as shown in FIGS. 11 and 12 the length Lf may vary with both the radial distance from the axis of rotation and azimuthal angle in a variety of different configurations. By varying the length of the fingers Lf the contact force between fingers and the surface of the wheel can be varied, and the prospects of the optimal length engaging a wheel surface can also be enhanced.

By configuring the finger lengths in a particular manner, as the brush assembly 200 rotates, relative motion is achieved on the stationary wheel that can at each location on a wheel surface, cyclically vary both the length of the fingers and contact pressure between fingers and the wheel surface.

It may be desirable for the length Lf of fingers 204 to periodically vary with the azimuthal angle of a finger 204 (i.e. the pattern is repeated as one progresses angularly around the brush component). A periodic repetition of length Lf that is symmetrical about the axis of rotation XR may be particularly desirable. As the force applied by a finger 204 varies with the length Lf of the finger 204, a brush component having fingers 204 with lengths Lf that vary symmetrically about an axis of rotation XR may result in a greater balance and may improve the durability and performance of brush assembly 200 and other components of system 250. For example, the length Lf of fingers 204 of an embodiment shown in FIGS. 11 and 12 varies both symmetrically and periodically with the azimuthal angle.

Figure 16:
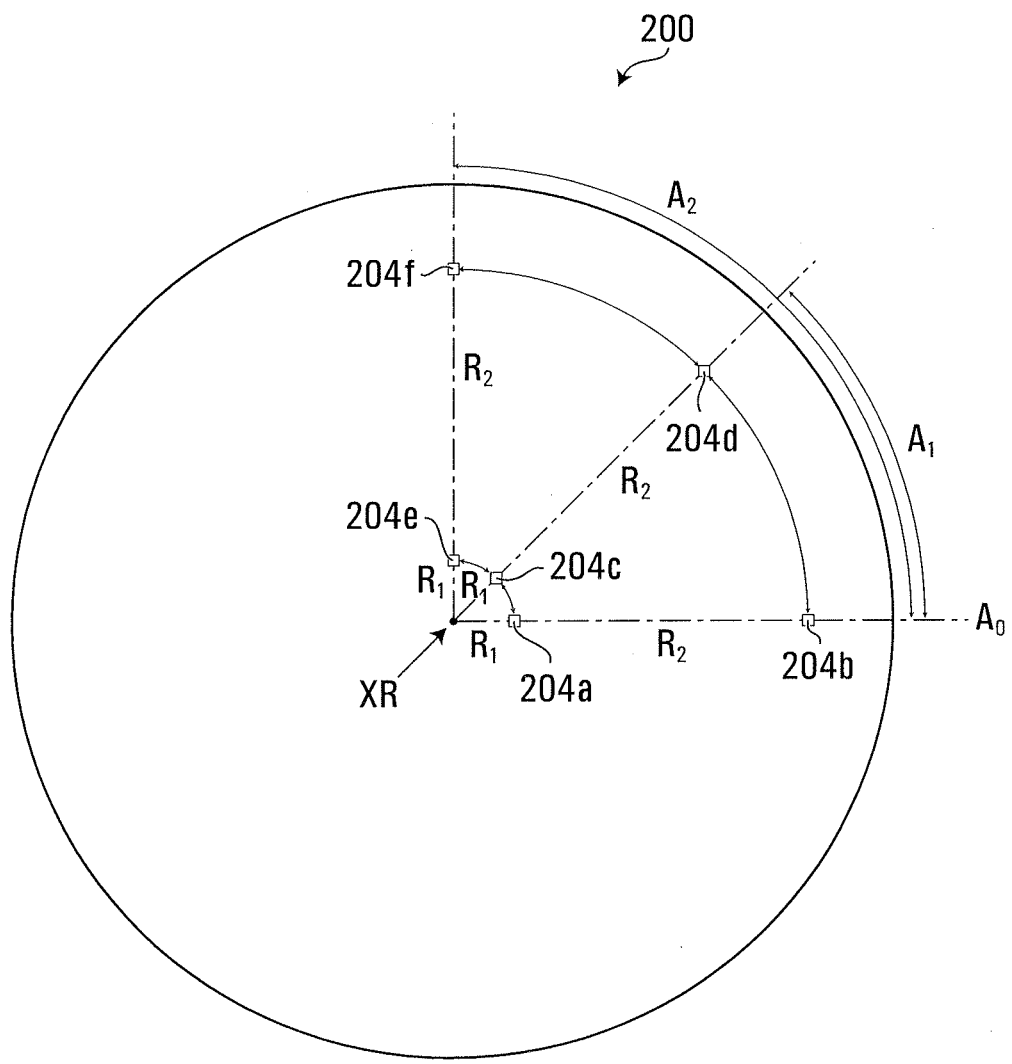
FIG. 16 is a schematic plan view of an embodiment of a brush component suitable for use in a "rollover" type wash system.

A schematic of brush assembly 200 showing only certain fingers 204a-204f is shown in FIG. 16. Fingers 204a and 204b both have the same azimuthal angle (A0) but have a different radial distance from the axis of rotation XR. Finger 204a has a radial distance of R1 from the axis of rotation XR, while finger 204b has a radial distance of R2. Fingers 204c and 204d both have an azimuthal angle of A1 and have radial distances of R1 and R2, respectively. Similarly, fingers 204e and 204f have an azimuthal angle of A2 and are located at radial distances of R1 and R2 respectively. If variation of the length Lf of a finger 204 is desired along a radial distance, for example, fingers 204c and 204d may have different lengths. Similarly, if variation of the length Lf of a finger 204 is desired with the azimuthal angle, fingers 204b and 204d may have different lengths.

With reference to FIG. 16, a periodic and symmetrical variation of the length Lf of fingers 204 may be described. The variation in finger length would be periodic with a period of 90 degrees if the variation repeated itself every 90 degrees. For example, if the variation was periodic with a period of 90 degrees, fingers 204a and 204e and fingers 204b and 204f would have the same length. A periodic variation of 90 degrees extending around the brush assembly 200 is one particular example of a variation of length of fingers 204 that is symmetrical about the axis of rotation XR.

A benefit of such configuration is that the apparatus may cyclically vary both the length of the fingers and contact pressure between fingers 204 and the wheel surface, yet during rotation of the brush assembly 200 the overall loading on the brush assembly may remain quite constant (particularly if the wheel surface has a constant or compatible symmetry to the brush surface). There may not be a significant variation in the overall transverse load and the transverse load may not be unevenly applied to the back plate 210.

Numerous other cyclically varying configurations may also be used.

Actuator 226 as schematically illustrated in FIG. 10 independently or in conjunction with system controller 99 may once engaged with a wheel, maintain the axial position of brush assembly 200 reasonably constant. So even when brush assembly 200 is comprised of fingers 204, at least a subset of fingers having different lengths, the overall transverse force may be relatively constant, while the individual fingers may cyclically vary the contact force applied to the wheel surface at any particular location on the wheel.

Improved performance may result from the fact that fingers 204 of different lengths are bent differently and at least some of the fingers 204 may be in an optimal or very good cleaning condition for a variety of surfaces located at different distances from backing 210. In contrast, if the axial position were varied with a brush assembly having fingers 204 of a uniform length, performance may be inferior as it may not be possible to effectively clean such a wide variety of surfaces located at different distances from backing 210.

The diameter D of brush assembly 200 may also vary depending on the type of vehicles frequently encountered in a particular wash facility. However, adequate performance for currently available passenger vehicles may be achieved with a brush having a diameter of approximately 30 inches. It is necessary to have a large enough diameter to effectively clean larger wheels while also permitting access to the wheels of smaller vehicles. Having fingers 204 of variable length facilitates access to the vehicle wheels on smaller vehicles, as a portion of brush assembly 200 may contact the side panels of a vehicle and limit the ability of brush assembly 200 to be brought into close proximity with a vehicle wheel 230.

Having a brush assembly 200 comprised of fingers 204 that are made of a soft, non-abrasive closed cell foam is particularly advantageous. In addition to the desirable characteristics of a foamed plastic described above, the foam used with the embodiment illustrated in FIGS. 9-16 may be selected to be non-abrasive yet be able to effectively clean vehicle wheels. For example, brush assembly 200 may contact the side panels 232 of vehicles having relatively small wheels, and should not scratch the paint or otherwise cause damage to said panels. Additional desirable properties of the foam as noted above include being lightweight, durable, flexible, and has a low surface energy to inhibit the built up of dirt and debris on the foam surface.

In operation, a vehicle may be driven into the wash facility. Other wash operations may then take place. When vehicle wheels are in a condition appropriate for cleaning, system controller 199 may cause actuator to move brush assembly 200 from inactive to an active state. System controller 199 may also activate drive assembly 223 to cause brush assembly to rotate at a substantially constant speed of approximately 75 to 90 revolutions/minute.

Brush assembly 200 may then be translated to come into contact with the entire outer peripheral surface of a vehicle wheel 230, similar to existing wheel washing systems used in "rollover" type wash systems. The axial position of brush assembly 200 may then be adjusted under the control of system controller 199, or another control system, while the brush assembly is maintained in contact with said outer peripheral surface of the vehicle wheel 230 to provide an appropriate position and/or overall force.

In some circumstances, due to the profile of the wheel (which may have portions on the rim that are angled transversely), during rotation of the brush assembly 200, the brush assembly 200 may have to move axially in order to create the necessary resistive force to counteract a given total transverse directed force $F^T$ imparted onto the brush assembly by actuator 226. The axial position of brush assembly 200 may be varied continuously and periodically. Small gradual changes of the axial position may result in suitable cleaning performance.

In other embodiments, it may be desirable to address variations in wheel profiles, particularly variations in wheel rim profiles, by cyclically varying the total transverse directed force $F^T$ imparted onto the brush assembly by actuator 226 as well. Controller 199 can be programmed to provide for a suitable variation in total transverse directed force $F^T$ imparted onto the brush assembly 200 by actuator 226. The variation in the transverse force may be created by cycling the brush assembly 200 through a predetermined series of axial positions relative to a wheel or may be determined dynamically by the control system based upon the resistive force applied to brush assembly 200. For example, when using certain brush assemblies having a cyclic variation in finger length, to clean vehicle wheels having prominent spokes, some dynamic control may be necessary for optimal performance. For example, if the pattern of the spokes on a vehicle wheel and the pattern of variation of finger length on a brush assembly have a certain relationship the potential for undesirable vibrations or resonant effects may be present. It is desirable that system controller 199 or another control system (not shown) be able to recognize undesirable operating conditions and take appropriate responsive action.

In embodiments where the transverse force $F^T$ applied by the brush assembly 200 is varied, through axial movement of the brush assembly or otherwise, this may create another layer or degree of cyclical variation in the actual contact pressure applied by individual fingers 204 to the wheel surfaces, and cyclical variations in effective finger lengths that engage the wheel surfaces. This may increase performance in certain embodiments when cleaning certain types of vehicle wheels compared to embodiments that do not vary the axial position or transverse force $F^T$ applied by brush assembly 200 to a vehicle wheel. Similarly, varying the transverse force $F^T$ by varying the axial position of brush assembly 200, dynamically or according to a predetermined pattern, may also provide the ability to more effectively clean vehicles wheels having a wider variety of configurations. Varying the axial force may also assist in controlling or preventing the likelihood of creating a resonant or harmonic effects resulting from the interaction between the variation in finger length and depth of a vehicle wheel.

Varying the axial position to vary the axial force may or may not provide optimal performance depending upon the configuration of the cleaning elements comprising brush assembly 200. For example, for certain patterns of variation of finger length, varying the axial position may increase performance improvement. In other embodiments, perhaps comprised of cleaning elements having different properties, performance may not be improved. However, as noted above, varying the axial position to vary the transverse force $F^T$ may be desirable to achieve effective or optimal performance.

Although, brush assembly 200 has been described as particularly suitable with use in a "rollover" type facility, it could be easier modified for use in a tunnel type wash facility by persons skilled in the art.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Of course, the above-described embodiments, are intended to be illustrative only and in no way limiting. The described embodiments of carrying out the invention are susceptible to many modifications of form, arrangement of parts, details and order of operation. The invention, rather, is intended to encompass all such modifications within its scope, as defined by the claims.

The invention claimed is:

1. A system for cleaning a vehicle wheel, said system comprising a brush mounted on a longitudinally oriented shaft for rotation in a path centered around the shaft at a suitable height to clean said wheel, said brush comprising a plurality of resilient scrubbing members extending different radial distances from said shaft to engage said wheel, such that said scrubbing members exert cyclically varying pressure against said wheel while said brush is rotated, wherein said rotation is about an axis offset from a center of a circular envelope of said brush defined by the smallest circle that circumscribes all of said scrubbing elements of said brush, at rest.

2. A system as claimed in claim 1 wherein said plurality of resilient scrubbing members define a radial envelope, and wherein the radial distance of said radial envelope from said shaft varies continuously around said radial envelope.

3. A system as claimed in claim 2 wherein said radial envelope is generally cylindrical.

4. A system as claimed in claim 1 wherein said shaft is oriented generally parallel to a floor portion in relation to which said vehicle moves.

5. A system as claimed in claim 1, wherein said brush is comprised of a plurality of longitudinally arranged brush segments mounted for rotation about said shaft.

6. A system as claimed in claim 5, wherein said resilient scrubbing members extend from each of said brush segments.

7. A system as claimed in claim 1 wherein said resilient scrubbing members are fingers having a height to width ratio that is greater than one.

8. A system as claimed in claim 7 wherein said fingers have a height to width ratio of about two to one.

9. A system as claimed in claim 7 wherein said fingers each have a distal end that is generally wedge shaped for enhancing the cleaning of said wheel.

10. A system as claimed in claim 1, wherein said brush is comprised of a flexible closed cell foam.

11. A system as claimed in claim 1, wherein said brush is a first brush and further comprising a second brush identical to said first brush, said first brush being mounted on said shaft at a first angular position, and said second brush being mounted on said shaft at a second angular position, said first angular position differing from said second angular position such that said first and second brushes rotate out of phase with each other.

12. A system as claimed in claim 11, wherein said first angular position is out of phase with said second angular position by about 90 degrees.

13. A system as claimed in claim 11 wherein:
said resilient scrubbing members define a radial envelope of each of said first and second brushes and said envelope of said first brush is generally circular and said first brush has a first centre axis, said first centre axis being off-set from said shaft; and
said envelope of said second brush is generally circular and said second brush having a second centre axis, said second centre axis being off-set from said shaft.

14. A system as claimed in claim 11, wherein said resilient scrubbing members comprise a plurality of fingers extending from a finger support core.

15. A system as claimed in claim 14, wherein said first and second brushes are each comprised of a plurality of longitudinally arranged brush segments.

16. A system as claimed in claim 15, wherein each of said plurality of longitudinally arranged brush segments comprises a finger support core and a plurality of said resilient scrubbing members extending from said finger support core.

17. A system as claimed in claim 15 wherein said resilient scrubbing members define a radial envelope for each brush segment and said radial envelope for each brush segment in said first brush is substantially the same.

18. A system as claimed in claim 17 wherein said radial envelope for each brush segment in said second brush is substantially the same.

19. A system as claimed in claim 1 wherein said brush is a first brush and further comprising second, third and fourth brushes substantially identical to said first brush said first brush being mounted on a shaft at a first angular position, and said second brush being mounted on said shaft at a second angular position, said third brush being mounted on said shaft at a third angular position, and said fourth brush being mounted on said shaft at a fourth angular position, said first, second, third and fourth angular positions all differing from each other, such that rotation of said first, second, third and fourth brushes is out of phase.

20. A brush assembly for mounting on a shaft defining a rotational axis in a system to clean a vehicle wheel, said brush assembly comprising first and second brush components, each of said first and second brush components comprising a plurality of resilient scrubbing members extending differing distances from said shaft, such that said resilient scrubbing members exert cyclically varying pressure on said wheel while said brush assembly is rotated; said first brush component being mounted on said shaft at a first angular position, and said second brush component being mounted on said shaft at a second angular position different from said first angular position, such that said first and second brush components rotate out of phase with each other; wherein said rotational axis is offset from a center of a circular envelope of said brush defined by the smallest circle that circumscribes all of said scrubbing elements of said brush, at rest.

21. The brush assembly as claimed in claim 20, wherein said resilient scrubbing members define a radial envelope of each of said brush components and said radial envelope of each of said brush components is a generally circular shape.

22. A method of cleaning a vehicle wheel surface on a vehicle wheel with a brush, said brush comprising a plurality of resilient scrubbing members having varying lengths, said method comprising rotating said brush to scrub said wheel with said scrubbing members, such that at any time during said rotating at least some of said plurality of scrubbing members are in engagement with said wheel surface, such that the lengths of scrubbing members engaging said wheel surface change cyclically and said scrubbing members exert cyclically varying contact pressure against said vehicle surface, wherein said rotating is about an axis offset from a center of a circular envelope of said brush defined by the smallest circle that circumscribes all of said scrubbing elements of said brush, at rest.

23. A system for cleaning a vehicle wheel surface on a vehicle wheel, said system comprising:
(a) a rotator
(b) a brush on said rotator comprising a plurality of resilient scrubbing members extending differing distances from said rotator;
said rotator operable to rotate said brush about said rotator such that at any time during rotation at least some of said plurality of resilient scrubbing members are in engagement with said wheel surface, such that the lengths of scrubbing members engaging said wheel surface change cyclically and said scrubbing members exert cyclically varying contact pressure against said wheel surface, wherein said rotator is mounted on an axis offset from a center of a circular envelope of said brush defined by the smallest circle that circumscribes all of said scrubbing elements of said brush, at rest.

24. A wheel cleaning device having a brush mounted for rotation about a hub proximate a wheel of a vehicle, said brush having a plurality of resilient scrubbing members extending differing distances from said hub to engage said wheel, such that said resilient scrubbing members exert cyclically varying pressure against said wheel while said brush is rotated, wherein said rotation is about an axis offset from a center of a circular envelope of said brush defined by the smallest circle that circumscribes all of said scrubbing elements of said brush, at rest.

* * * * *